US011392728B2

(12) United States Patent
Porter et al.

(10) Patent No.: US 11,392,728 B2
(45) Date of Patent: Jul. 19, 2022

(54) SYSTEMS AND METHODS FOR IMPROVED PARAMETRIC MODELING OF STRUCTURES

(71) Applicant: Geomni, Inc., Jersey City, NJ (US)

(72) Inventors: Bryce Zachary Porter, Lehi, UT (US); John Caleb Call, Lehi, UT (US); Ismael Aguilera Martín de Los Santos, Madrid (ES); Ángel Guijarro Meléndez, Madrid (ES); Jeffery D. Lewis, Orem, UT (US); Corey D. Reed, Cedar Hills, UT (US)

(73) Assignee: Insurance Services Office, Inc., Jersey City, NJ (US)

(*) Notice: Subject to any disclaimer, the term of this patent is extended or adjusted under 35 U.S.C. 154(b) by 222 days.

(21) Appl. No.: 16/443,058

(22) Filed: Jun. 17, 2019

(65) Prior Publication Data

US 2019/0384866 A1 Dec. 19, 2019

Related U.S. Application Data

(60) Provisional application No. 62/685,434, filed on Jun. 15, 2018.

(51) Int. Cl.
*G06F 30/13* (2020.01)
*G06F 3/04845* (2022.01)
*G06F 3/04815* (2022.01)
*G06F 30/17* (2020.01)
*G06F 111/20* (2020.01)

(52) U.S. Cl.
CPC .......... *G06F 30/13* (2020.01); *G06F 3/04815* (2013.01); *G06F 3/04845* (2013.01); *G06F 30/17* (2020.01); *G06F 2111/20* (2020.01)

(58) Field of Classification Search
CPC .......... G06F 30/13; G06F 30/17; G06F 30/00; G06F 2111/20; G06F 3/04815; G06F 3/04845; G06F 2111/10; G06F 2111/04
USPC .......................................................... 703/1
See application file for complete search history.

(56) References Cited

U.S. PATENT DOCUMENTS

| 4,882,692 A | 11/1989 | Saxton et al. |
| 2004/0105573 A1 | 6/2004 | Neumann et al. |
| 2007/0225847 A1 | 9/2007 | Pietsch et al. |
| 2011/0146078 A1 | 6/2011 | Hauptman et al. |
| 2013/0211790 A1 | 8/2013 | Loveland et al. |

(Continued)

OTHER PUBLICATIONS

Yenerim, Duygu et al., "BIM-Based Parametric Modeling: A Case Study", 2011, Proceedings of the International Conference on Modeling, Simulation and Visualization Methods (MSV), Computer Engineering and Applied Computing (WorldComp). (Year: 2011).*

(Continued)

*Primary Examiner* — Cedric Johnson
(74) *Attorney, Agent, or Firm* — McCarter & English, LLP

(57) ABSTRACT

A system and method for generating a parametric model of a roof structure comprising a processor in communication with a memory. The system receives a plurality of parameters of each roof component composing the roof structure and performs a geometry creation based on the received plurality of parameters. The system generates a constrained three-dimensional geometry based on an output of the geometry creation, and displays a three-dimensional model of the roof structure based on the constrained three-dimensional geometry.

12 Claims, 25 Drawing Sheets

(56) References Cited

U.S. PATENT DOCUMENTS

2013/0211791 A1* 8/2013 Tsai .................. G06T 17/10
                                                        703/1
2015/0095881 A1   4/2015 Jezyk et al.
2017/0316115 A1* 11/2017 Lewis .................. G06T 7/55

OTHER PUBLICATIONS

Janssen, Patrick et al., "Automated Generation of BIM Models", 2016, BIM Concepts, vol. 2, eCAADe. (Year: 2016).*
International Search Report of the International Searching Authority dated Nov. 8, 2019, issued in connection with International Application No. PCT/US2019/037467 (4 pages).
Written Opinion of the International Searching Authority dated Nov. 8, 2019, issued in connection with International Application No. PCT/US2019/037467 (6 pages).
Extended European Search Report dated Feb. 3, 2022, issued by the European Patent Office in connection with European Patent Application No. 19820509.8 (10 pages).
Yenerim, et al., "BIM-Based Parametric Modeling: A Case Study," Proceedings of the International Confernce on Modeling, Simulation and Visualization Methods, Jan. 1, 2011 (6 pages).
Janssen, et al., "Automated Generation of BIM Models," BIM Concepts, Jan. 1, 2016 (8 pages).

* cited by examiner

The vector lifted and normalized

The vector rotated

Direction of the input segment

SYSTEMS AND METHODS FOR IMPROVED PARAMETRIC MODELING OF STRUCTURES

RELATED APPLICATIONS

This application claims priority to U.S. Provisional Application Ser. No. 62/685,434 filed on Jun. 15, 2018, the entire disclosure of which is hereby expressly incorporated by reference.

BACKGROUND

Technical Field

The present disclosure relates generally to the field of computer modeling of structures. More specifically, the present disclosure relates to systems and methods for improved parametric modeling of structures.

Related Art

Information related to the roofs of buildings is often used by construction professionals to specify materials and associated costs for both newly-constructed buildings, as well as for replacing and upgrading existing structures. A 3D model of a roof structure can be used to take precise measurements from the 3D geometry. The 3D roof model can be formed by multiple connected geometric objects including points, line segments and planar surfaces. Roof faces are represented using planar polygons that are formed by points and line segments, all of which lie on the same plane. Measurements, such as total roof surface area, total line length of eaves, rakes, valleys, ridges, and hip ridges, etc. can be taken from the 3D roof model. In order to accurately measure values from the 3D roof model, the 3D roof model must be constrained and maintain cohesion between its geometric components. The constrained 3D roof model has only valid planar geometric components that do not overlap or extend into the interior of the 3D roof model. A cohesive 3D roof model means that each polygonal surface of the roof fits together exactly and are connected by line segments and points.

When modeling a roof structure in 3D using computer aided design software, it is possible to create the polygonal surfaces of the model manually. This can be performed quickly for an initial creation of the roof geometry. However, when manipulations to the 3D roof structure are desired, it becomes tedious and difficult to manually maintain a constrained and cohesive 3D roof model. In order to improve the ability to edit a 3D model of roof structures, systems and methods for parameterizing a 3D roof model are needed. By parameterizing the 3D roof model, a user can manipulate the parameters that define the roof structure and the 3D geometry is automatically updated to reflect changes to the parameters. Parameterizing the model also ensures a more accurate and numerically stable geometric representation of the roof structure. Doing so also improves the function and capabilities a system modeling a 3D roof model. As such, the ability to parameterize a 3D roof model is a powerful tool during a 3D modeling process. Accordingly, the systems and methods disclosed herein address these and other needs.

SUMMARY

This present disclosure relates to systems and methods for improved parametric modeling of structures. The system combines two or more roof components to generate a roof structure. In a first processing phase, the system parameterizes a roof structure using roof components. In particular, the first phase receives, as input, a set of parameters for each roof component that is to compose the roof structure, and processes the set of parameters through a first algorithm which outputs one or more 3D polyhedrons. The 3D polyhedrons are then accepted as input into a second algorithm that combines the 3D polyhedrons to generate a 3D roof geometry. A second processing phase parameterizes a roof structure by defining an exterior contour of a roof, planes that define surfaces of the roof, and user defined actions that occur at various locations in the roof structure. Both the first method and the second method constrain the 3D roof geometry that forms a roof model and makes it faster and easier to adjust the geometry after creation.

BRIEF DESCRIPTION OF THE DRAWINGS

The foregoing features of the invention will be apparent from the following Detailed Description of the Invention, taken in connection with the accompanying drawings, in which.

DETAILED DESCRIPTION

The present disclosure relates to systems and methods for parameterizing a roof structure to maintain roof constraints and cohesion, as described in detail below in connection with FIGS. 1-25.

By way of background, a roof component is a single element of a roof that is defined by parameters and constraints. Roof components can be combined to create complex roof structures. The roof component can be defined by an architectural type of the roof structure. Specifically, the roof component can include, but is not limited to, a gable, a hip, a turret, a shed, a hip-gable, a Dutch hip, a barrel, a pyramid, a partial-hip, a mansard, a flat-mansard, a gambrel, a chimney, a tie-in, a bay window, a nested-turret, etc.

The system of the present disclosure carries out two processing phases for combining two or more roof components to generate a roof structure. The first processing phase parameterizes a roof structure using roof components. Specifically, as will be discussed in further detail below, the first phase receives, as input, a set of parameters for each roof component that is to compose the roof structure. The set of parameters are processed through a first algorithm which outputs one or more 3D polyhedrons. The 3D polyhedrons are then accepted as input into a second algorithm that combines the 3D polyhedrons to generate a 3D roof geometry. The second processing phase parameterizes a roof structure by defining an exterior contour of a roof, planes that define surfaces of the roof, and user defined actions that occur at various locations in the roof structure. Both the first and second phases constrain the 3D roof geometry that forms a roof model and makes it faster and easier to adjust the geometry after creation.

Figure 1:
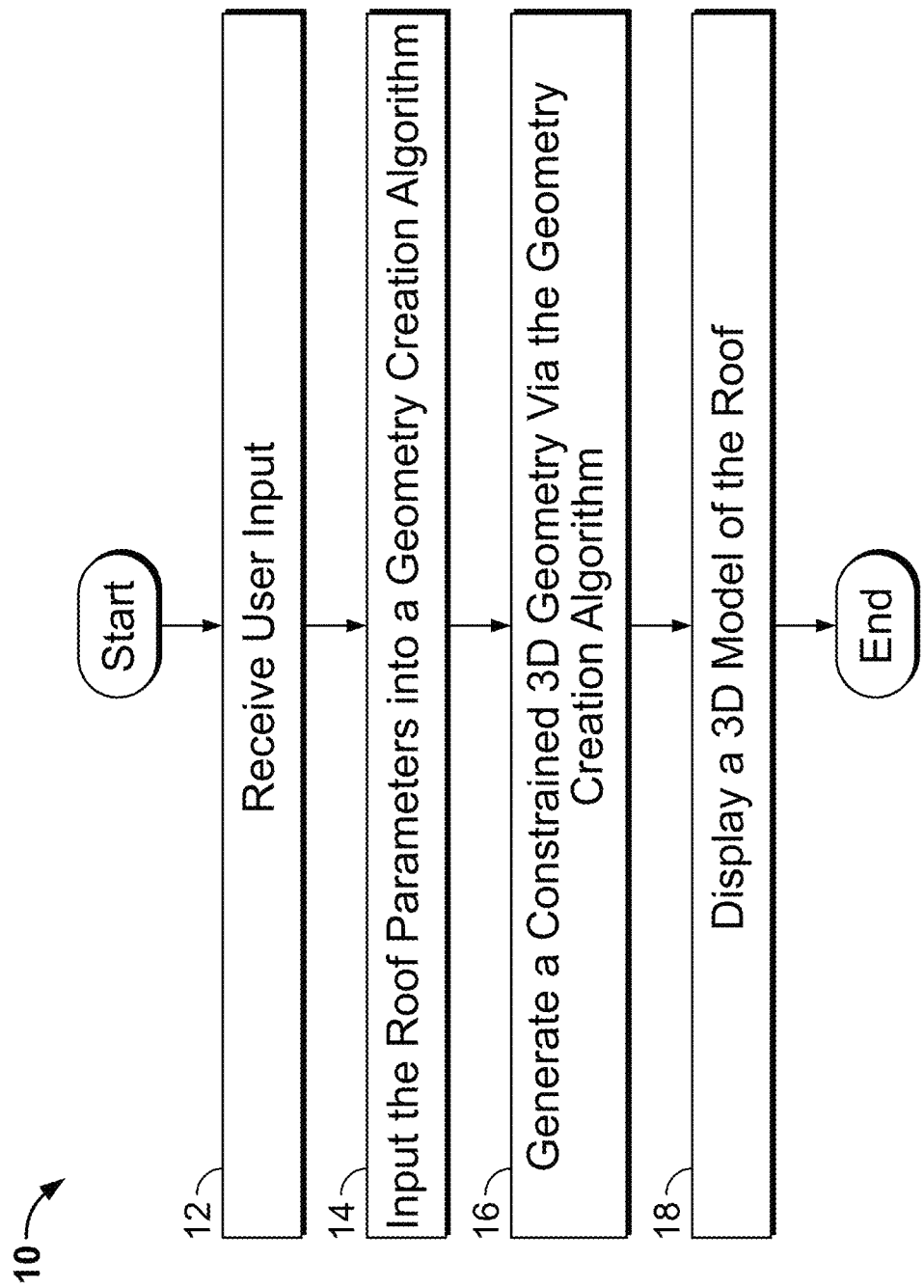
FIG. 1 is a flowchart illustrating overall process steps of the first processing phase carried out by the system of the present disclosure.

FIG. 1 is a flowchart illustrating the overall process steps of the first processing phase carried out by the system, indicated generally at 10. Specifically, FIG. 1 illustrates processing steps carried out by the system for parameterizing a roof structure using roof components. Beginning in step 12, the system receives user input. The user input can include an identification of one or more roof components appearing in a digital image, roof parameters, roof constraints, or any combination thereof. The roof parameters and roof constrains can be used to generate a roof component(s). The input can be received through a command-line interface, graphical user interface, or any other suitable method.

In step 14, the system inputs the roof components into a geometry creation algorithm ("GCA"). In step 16, the system generates a constrained 3D geometry via the GCA. Step 16, and the GCA in particular, will be described in more detail below. In step 18, the system displays a 3D model of the roof. The 3D roof model can be composed of points, line segments, surfaces, etc.

Figure 2:
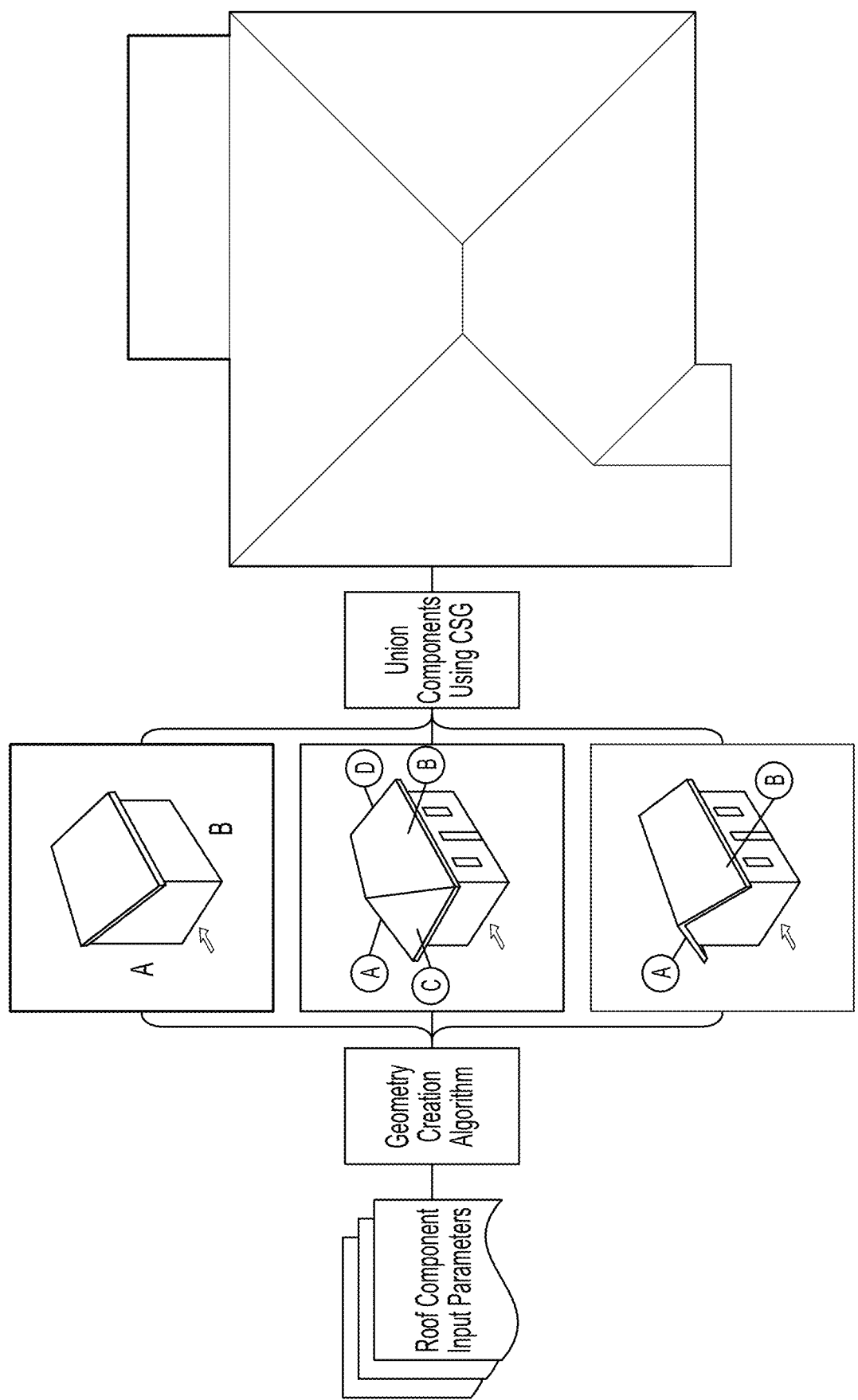
FIG. 2 is a diagram illustrating a diagram of the processing steps in connection with FIG. 1.

Referring to FIG. 2, illustrated therein is a diagram of the processing steps discussed in connection with FIG. 1. The processing steps of the invention disclosed herein could be embodied as computer-readable software code executed by one or more computer systems, and could be programmed using any suitable programming languages including, but not limited to, C, C++, C#, Java, Python or any other suitable language. Additionally, the computer system(s) on which the present disclosure can be embodied includes, but is not limited to, one or more personal computers, servers, mobile devices, cloud-based computing platforms, etc., each having one or more suitably powerful microprocessors and associated operating system(s) such as Linux, UNIX, Microsoft Windows, MacOS, etc. Still further, the invention could be embodied as a customized hardware component such as a field-programmable gate array ("FPGA"), application-specific integrated circuit ("ASIC"), embedded system, or other customized hardware component without departing from the spirit or scope of the present disclosure.

Figure 3:
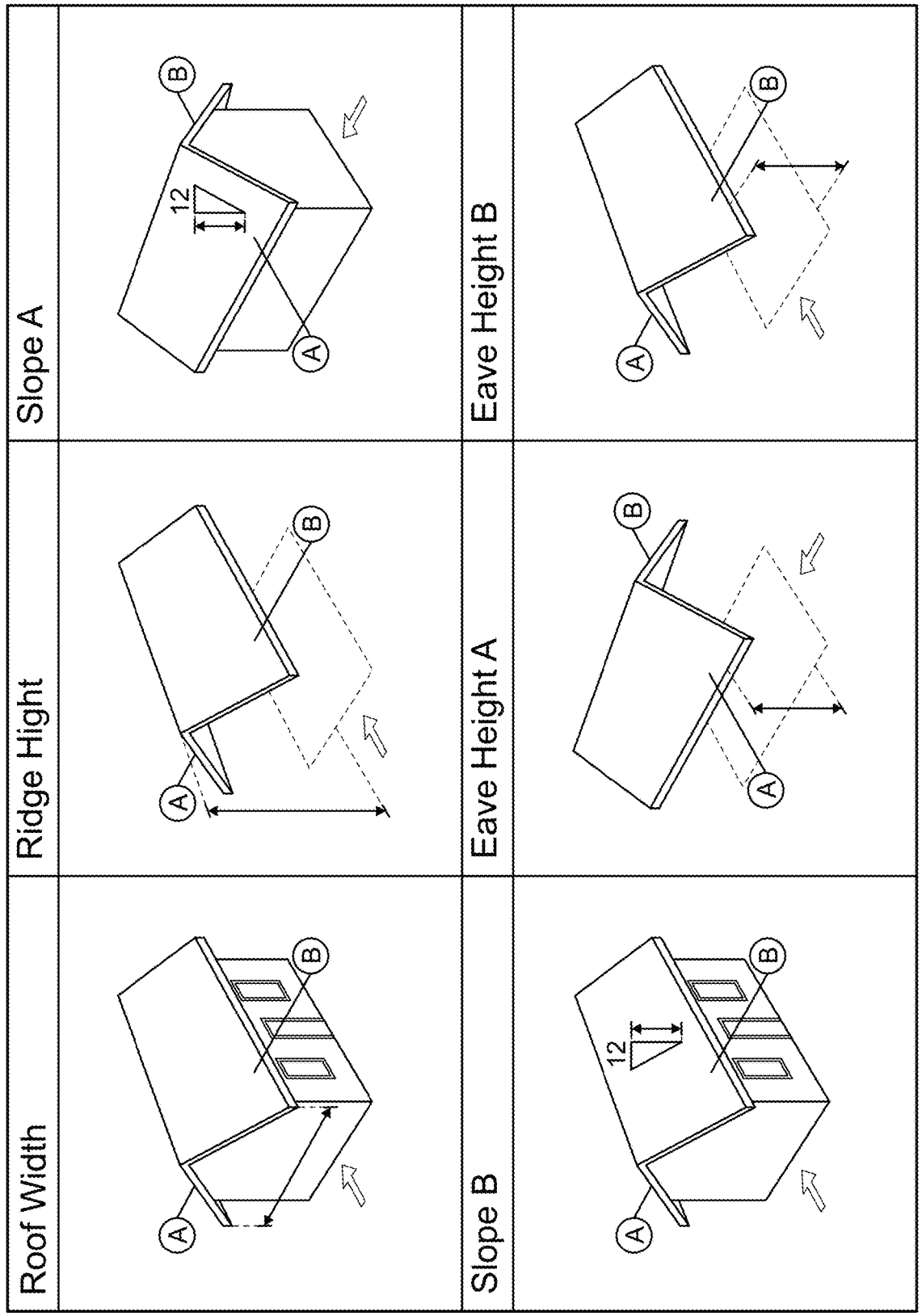
FIG. 3 is a diagram illustrating an example of a parameter set for a gable roof component.

As discussed above, each roof component is defined by a set of parameters and constraints that direct the creation of a constrained 3D geometry. FIG. 3 is an example of a parameter set for a gable roof component. As shown in FIG. 3, a roof component can also have parameters assigned per roof face. The parameters for the gable roof component can include, but is not limited to, a roof width, a roof length, a ridge height, a slope, a eave height, an azimuth, a roof reference point, a pitch, a roof contour, etc. (some of the parameters are not shown in FIG. 3). Roof components can be symmetrical or asymmetrical. When a roof component is asymmetrical, the roof parameters are defined per side of the roof component. For example, as shown in FIG. 3, side A and side B of the gable roof component each have an eave height parameter and a slope parameter, which can have a same value or different values.

It should be noted that the GCA can define which roof components can have asymmetrical parameters and which cannot. Further, multiple parameter subsets can specify the same geometry constraints and/or parameters. For example, if a ridge height, an eave height and a roof width are defined, then the pitch and slope can be derived. It is determined by the GCA what the minimum required parameter set is and any redundant parameters received as inputs can be ignored or flagged.

Figure 4:
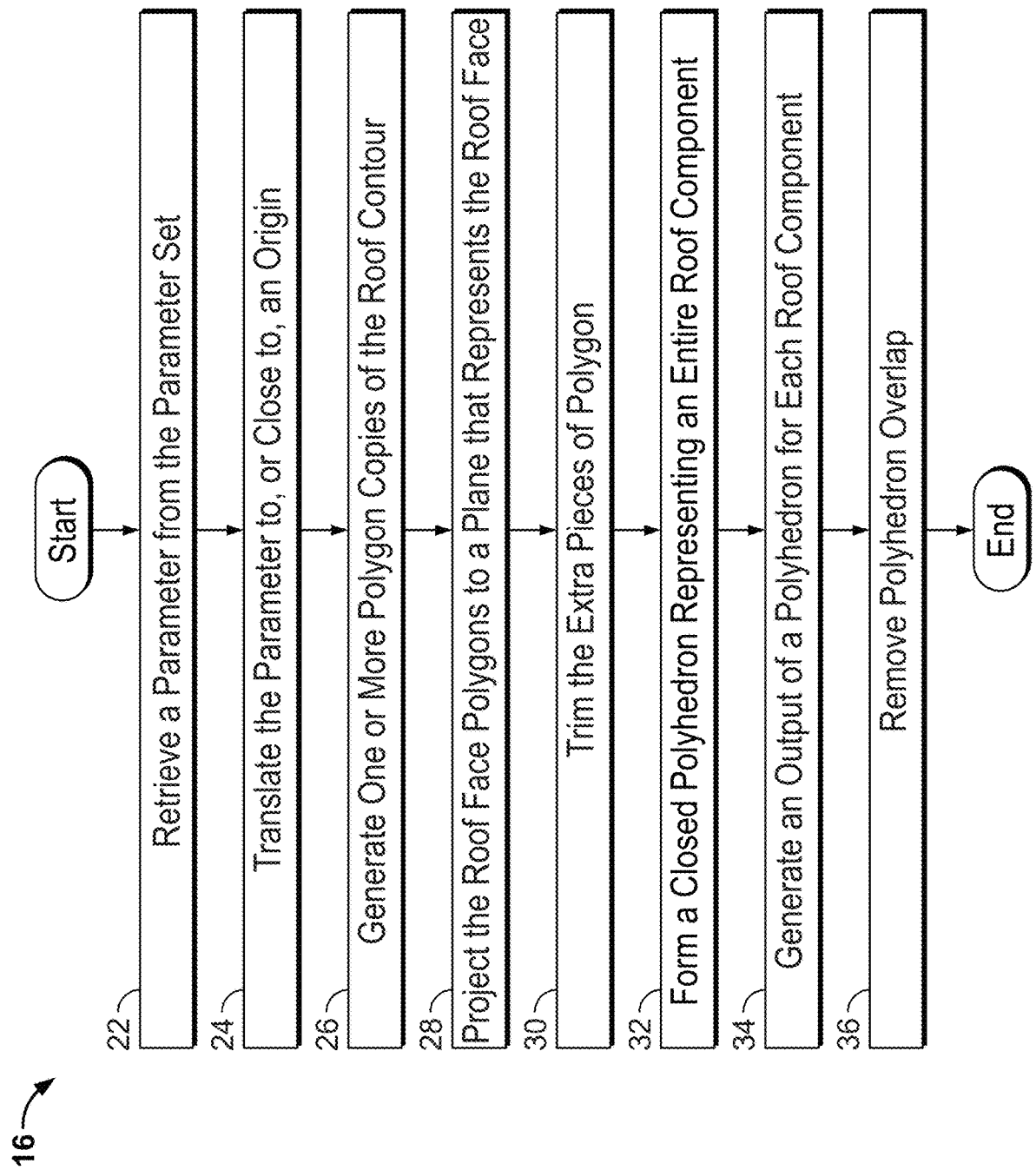
FIG. 4 is a flowchart illustrating step 16 of FIG. 1 in greater detail.
Figure 5A:
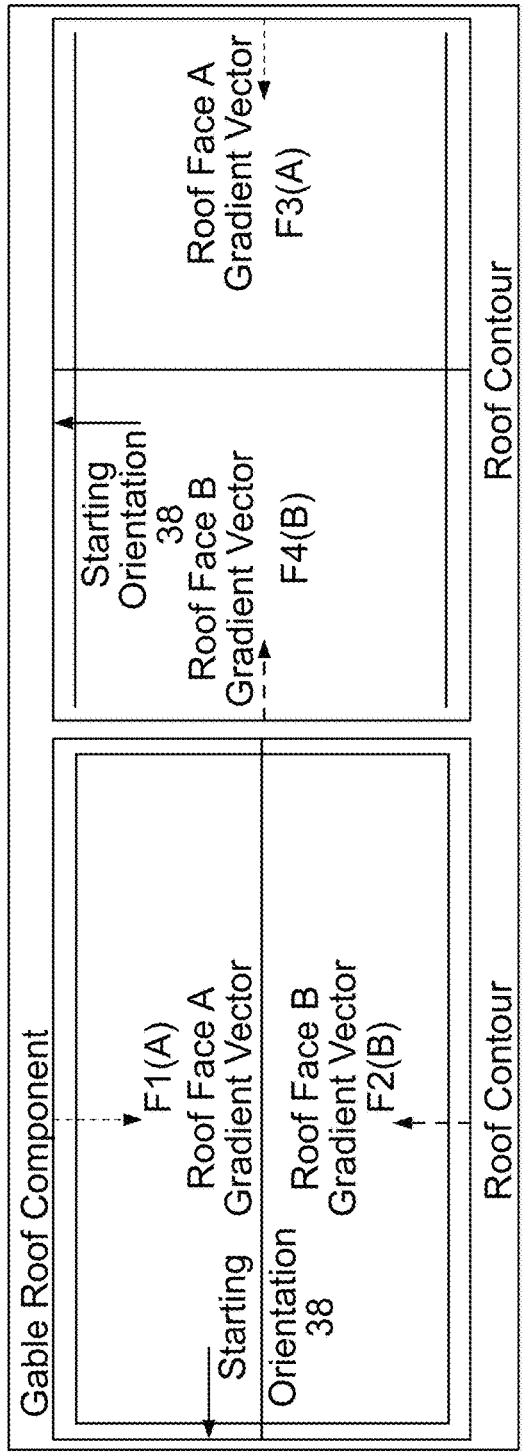
FIGS. 5A-5B are diagrams illustrating roof components and starting orientations.
Figure 5B:
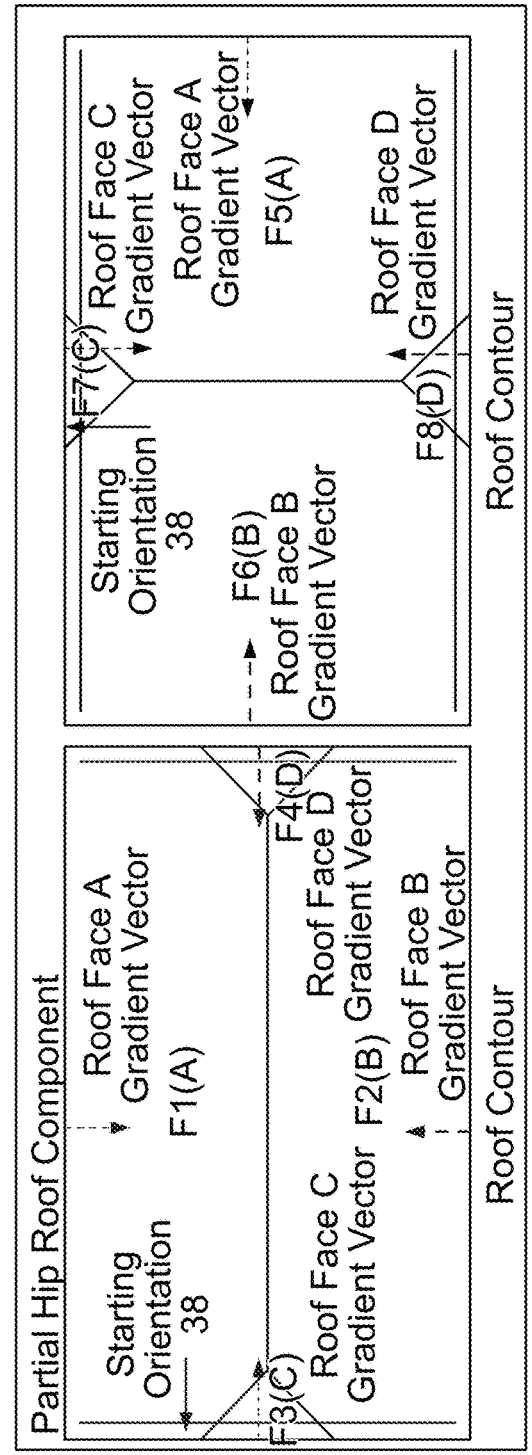

FIG. 4 is a flowchart illustrating step 16 of FIG. 1 in greater detail. In particular, FIG. 4 illustrates process steps for generating the constrained 3D geometry via the GCA. It should first be noted that the GCA can require a minimum parameter set. In an embodiment, the minimum parameter set includes a component type, a roof contour, an eave height, a slope and an orientation assigned to a segment in the roof contour. The orientation can determine how roof face properties are assigned to segments that form the roof contour. FIGS. 5A and 5B illustrate the purpose of the orientation and how the orientation can change a final roof geometry. Specifically, a starting orientation arrow 38 indicates a starting orientation. The orientation determines how individual face parameters are assigned to the roof contour segments. FIG. 5A shows two examples of a gabel roof component with two roof faces and two gradient vectors perpendicular to the starting orientation. FIG. 5B shows two examples of a partial hip roof component with four roof faces (indicated via labels "A", "B", "C", and "D") and four gradient vectors (indicated via dotted arrows) to illustrate how the roof faces and the gradient vectors are defined relative to the starting orientation. The individual face parameters can be assigned in a clockwise order starting at the selected orientation, or in any other desirable order.

Referring back to FIG. 4, in step 22, the system retrieves a parameter from the parameter set. In an embodiment, the system retrieves the roof contour, which is specificed in world coordinates. It should be noted that the roof contour will be used to describe the remaining steps of FIG. 4. However, those skilled in the art would understand how to substitute other parameters from the parameter set into the steps of FIG. 4.

In step 24, the system translates the retrieved parameter (e.g., the roof contour) to, or close to, an origin. In an embodiment, the system chooses an arbitrary point in the roof contour and translates the roof contour such that the chosen point lies on the origin of a coordinate system. By translating the roof contour, a numerical stability of geometric operations performed by the GCA is improved.

In step 26, the system generates one or more polygon copies of the roof contour. In an embodiment, the one or more copies are equal to a number of roof faces that are associated with the roof component type (e.g., a gable, a hip, etc.). The resulting polygon copies can be used as starting polygons for the roof faces. Each roof face polygon can be a flat, horizontal polygon.

In step 28, the system projects the roof face polygons to a plane that represents the roof face. The plane that represents the roof face is defined by roof face input parameters. The roof face planes are defined by an eave height, a slope and a relationship to the starting orientation. The gradient vector of each roof face plane is defined as a perpendicular or parallel vector to the starting orientation. For example, in a gable roof component type, there are two roof faces and the gradients of the two roof face planes are both perpendicular to the starting orientation. Returning to FIG. 5, which shows how the roof face gradients are defined relative to the starting orientation. A roof face plane can be defined by a normal vector and a point on the roof face plane. The roof face normal can be determined using the gradient and the slope of the roof face plane. A point on the roof face plane is determined by a roof contour edge and an eave height. After the system defines the roof face plane, each point in the roof face polygon is projected onto the roof face plane. Specifically, the Z component of each point in the roof face polygon is adjusted such that the point lies on the roof face plane. At this stage, a collection of roof face polygons have been projected to the roof face plane and are defined by the input parameters. The collection of roof face polygons can have one or more intersections, which form one or more extra pieces of polygon that belong to a final roof face polygon.

Figure 6:
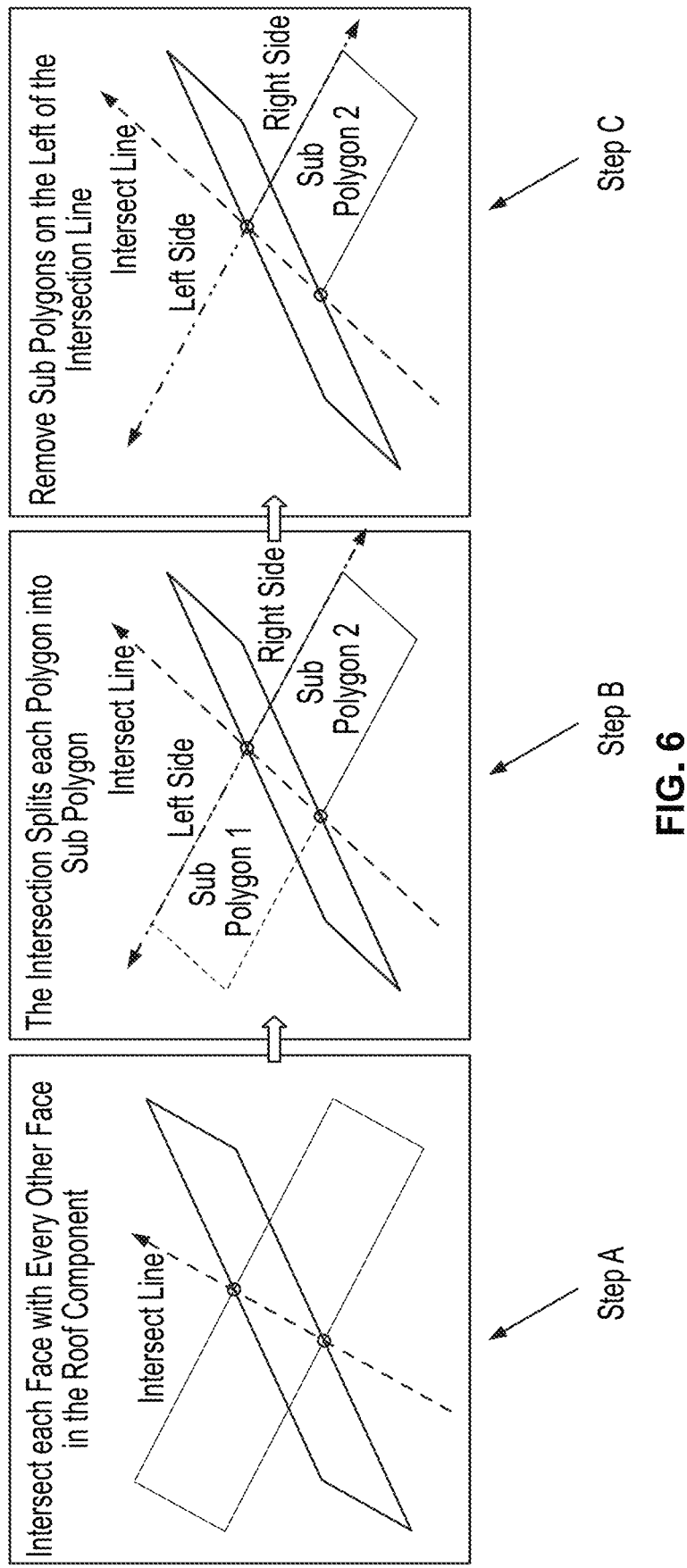
FIG. 6 is a diagram illustrating retention by the system of an intersection line.

Returning to FIG. 4, in step 30, the system trims the extra pieces of polygon. For example, each polygon is split by its intersection with the other polygons. The system then determines which sub-polygons (pieces of a polygon) are to be removed based on a relationship of the sub-polygons to the other polygons in the roof geometry. FIG. 6 shows an illustration of the trimming process. Specifically, FIG. 6 shows a first roof face polygon trimmed by a second roof face polygon. In step A, the system determines an intersect line formed by the first roof face polygon and the second roof face polygon. In step B, the system uses the intersect line to split the roof face polygon into a first sub-polygon and a second sub-polygon. In step C, the system determines which of the two sub-polygons is to be kept to form the roof geometry by, for example, checking which side of the intersect line each sub-polygon lies on. The right and left sides of the intersect line, as seen in step B and step C, are determined using the direction of the intersect line and can be dependent on a winding of the roof face polygons. The side of the intersection that should be kept can also be dependent on the polygon winding. FIG. 6 demonstrates an example where the right side of the intersect line should be kept. Thus, all sub-polygons (e.g., sub-polygon 2) that are completely contained on the right side of the intersect line are kept and the sub-polygons on the left side (e.g., sub-polygon 1) of the intersect line are removed. Additionally, the trimming process can define some roof break lines, such as flat ridges and hip ridges. It should be understood that any other suitable method for building the polygons of the roof faces can also be used.

Figure 7:
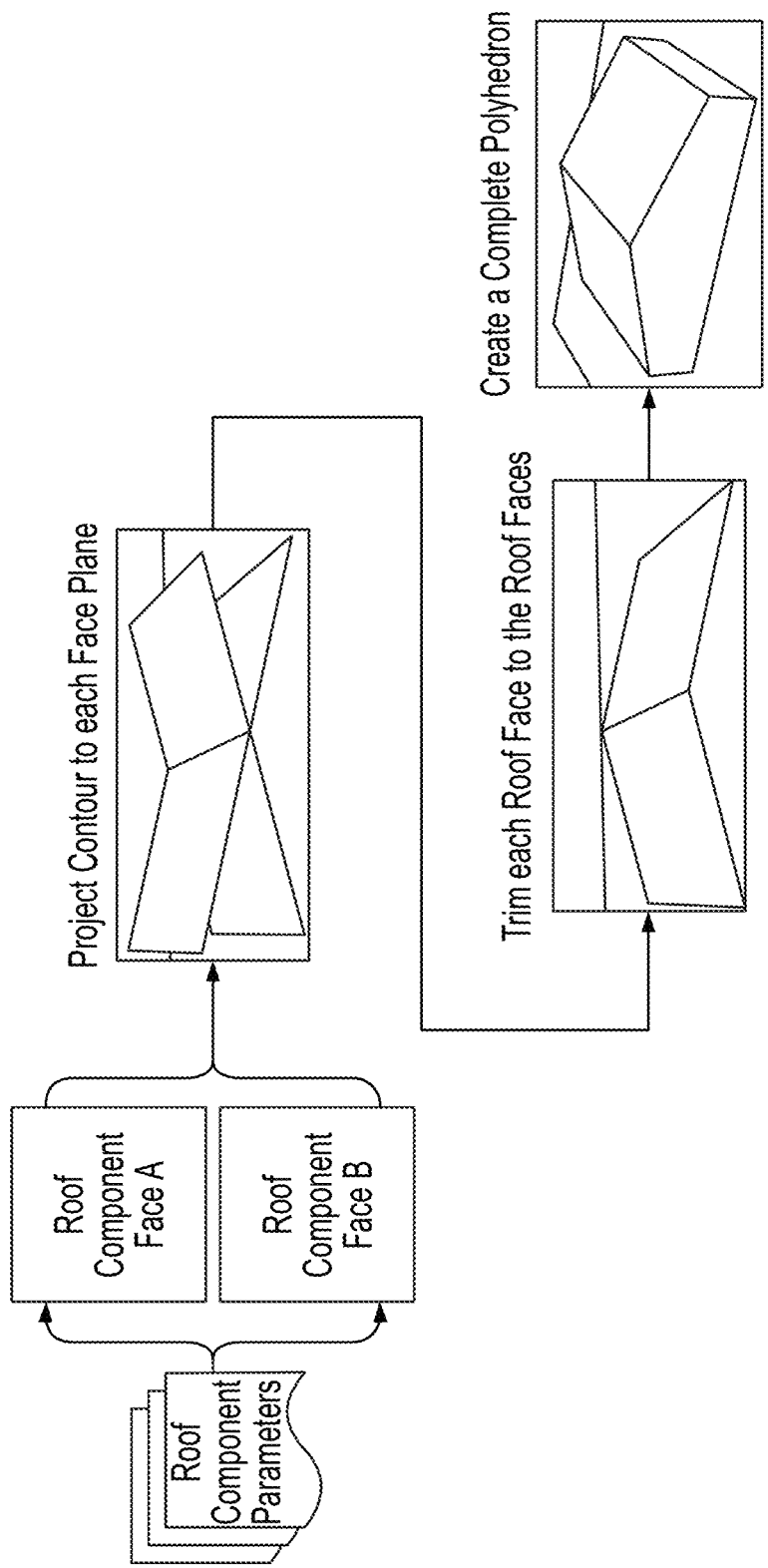
FIG. 7 is a diagram illustrating creation by the system of a polyhedron that represents a roof component.

Referring back to FIG. 4, in step 32, the system forms a closed polyhedron representing an entire roof component. Specifically, the system extends vertical polygons down from each exterior roof segment and generates wall polygons of the polyhedron. The wall polygons can be offset from the roof face edges representing an eave overhand if, for example, the input parameters are specified. The polyhedron is then closed by creating a bottom polygon that contains all the bottom edges of the wall polygons. FIG. 7 is an illustration of the creation of the polyhedron that represents the roof component.

Figure 8:
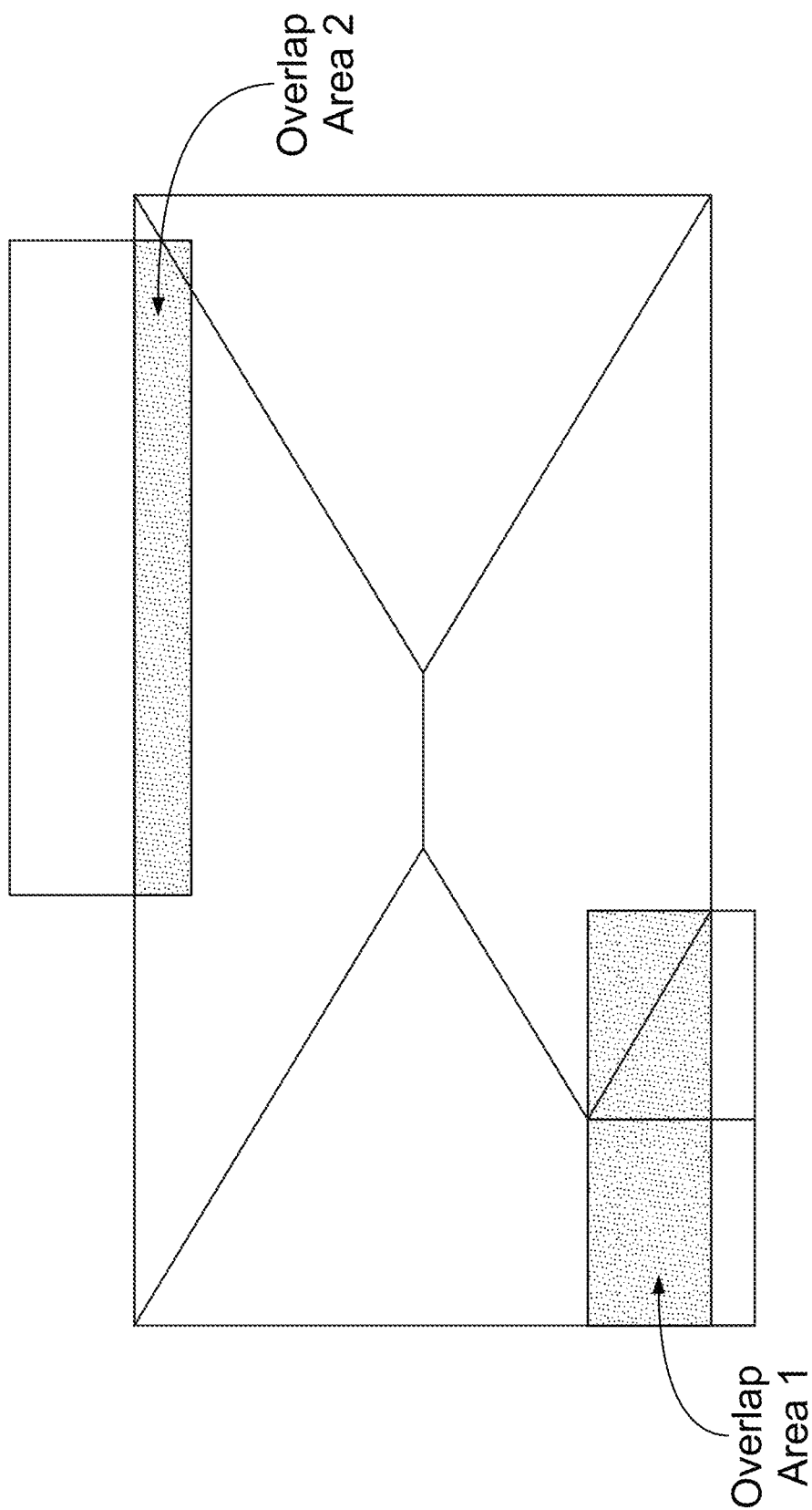
FIG. 8 is a diagram illustrating a roof geometry composed of three roof components.

In step 34, the system generates an output of a polyhedron for each roof component. The polyhedrons can overlap each other, which can indicate that there are interior surfaces that exist and would contribute to the measurements that could be extracted from the final 3D roof geometry. FIG. 8 is an illustration of a roof geometry composed of three roof components. Overlap area 1 and overlap area 2 indicate where the polyhedrons can overlap. It should be understood that if measurements were to be taken from the roof geometry illustrated in FIG. 8, the measurements would be inaccurate because of overlapping areas.

In step 36, the system removes polyhedron overlap. In an embodiment, the system can execute a constructive solid geometry ("CSG") algorithm or any other suitable algorithm for performing binary operations on a polyhedral. The CSG algorithm uses binary operators to combine overlapping polyhedrons into a single, more complex polyhedron. The binary operations used in CSG can include union, intersection or difference. Each of the binary operations produce an inside or outside classification for each part of the polyhedron. The output of the CSG algorithm is a polyhedron that forms a complete 3D model representation of the roof ("3D roof model").

Figure 9:
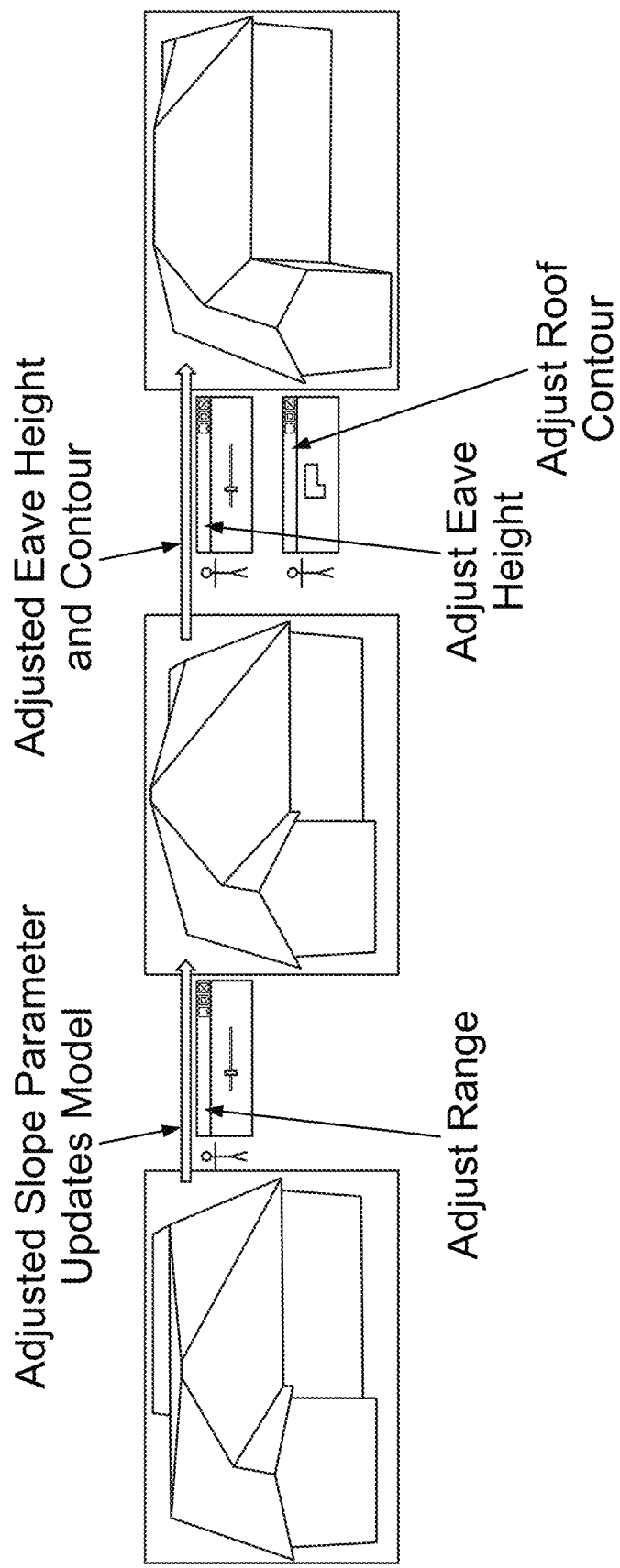
FIG. 9 is a diagram illustrating adjustment of a parameter of a roof component and the 3D model being updated automatically.

The 3D roof model can be saved or displayed to a user using any suitable method for displaying 3D geometry. In an embodiment, the user can use an interface to add more roof components or manipulate the existing roof components. FIG. 9 is an illustration showing how the user can adjust a parameter of a roof component and the 3D roof model is updated automatically. Those skilled in the art would understand that without the 3D roof model being parameterized, the user would have to adjust each polygon and also ensure that the 3D roof model remains cohesive. With the 3D roof model being parameterized, the structure of the 3D roof model remains a closed polyhedron. This allows the system to rapidly and automatically generate a more accurate 3D model of a structure.

It is often desirable that the interface used to generate and manipulate the roof allows the user to lock certain parameters so they are not adjusted during geometry creation. For example, changing the slope of the roof can result in two acceptable geometric changes. In an embodiment, the user can adjust the slope of a roof component by locking a ridge height and adjusting a eave height. The system could also lock the eave height and adjust the ridge height. Both of these approaches would result in a slope adjustment. It should be understood that due to ambiguity, it is often useful to have the ability to lock parameters.

Figure 10:
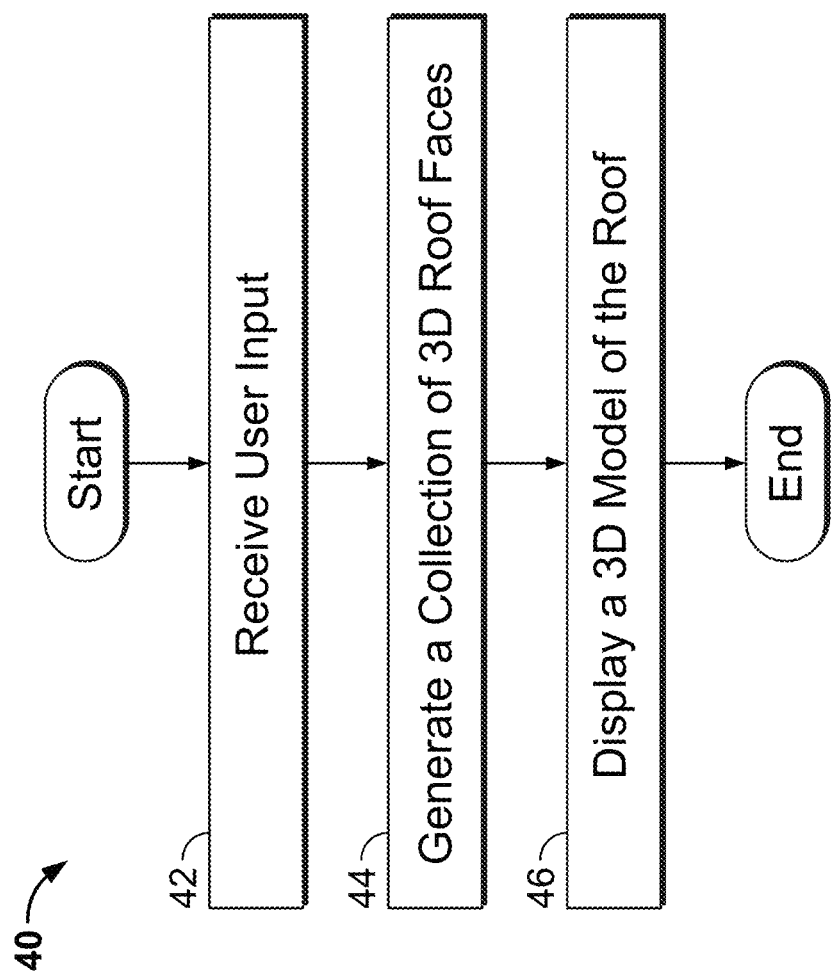
FIG. 10 is a flowchart illustrating overall process steps of the second processing phase carried out by the system of the present disclosure.

FIG. 10 is a flowchart illustrating the overall process steps of the second method carried out by the system, indicated generally at 40. In step 42, the system receives user input. The user input can include an indication of the contour of a roof (e.g., roof contour segments or segments). The contour of the roof can be a collection of segments ordered counter-clockwise. Each segment has a slope value associated with it or the user can input the slope value.

In step 44, the system generates a collection of 3D roof faces. In an embodiment, the system generates the collection of 3D roof faces via a modified straight skeleton algorithm. Those skilled in the art would understand that other algorithms can be used. In step 46, the system displays a 3D model of the roof.

Figure 11B:
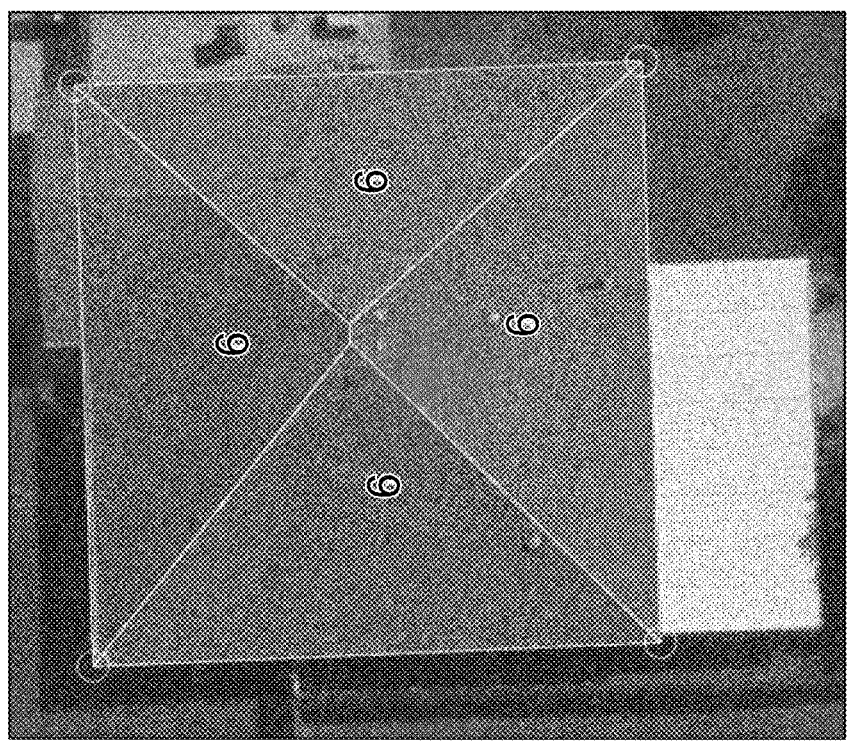
FIGS. 11A-11B are diagrams illustrating an input to the modified straight skeleton algorithm and an output from the modified straight skeleton algorithm.
Figure 11A:

It should be noted that the modified straight skeleton algorithm produces as a collection of 3D roof faces, with each individual face tied back to an input segment. FIGS. 11A-11B are illustrations of an input to the modified straight skeleton algorithm and an output from the modified straight skeleton algorithm. Specifically, FIG. 11A shows an input of the roof contour segments and FIG. 11B shows the modified straight skeleton algorithm generating the collection of 3D faces with slopes according to the input segment.

Figure 12B:
FIGS. 12A-12B are diagrams illustrating an output of the modified straight skeleton algorithm based on the input contour segments illustrated in FIG. 11.
Figure 12A:
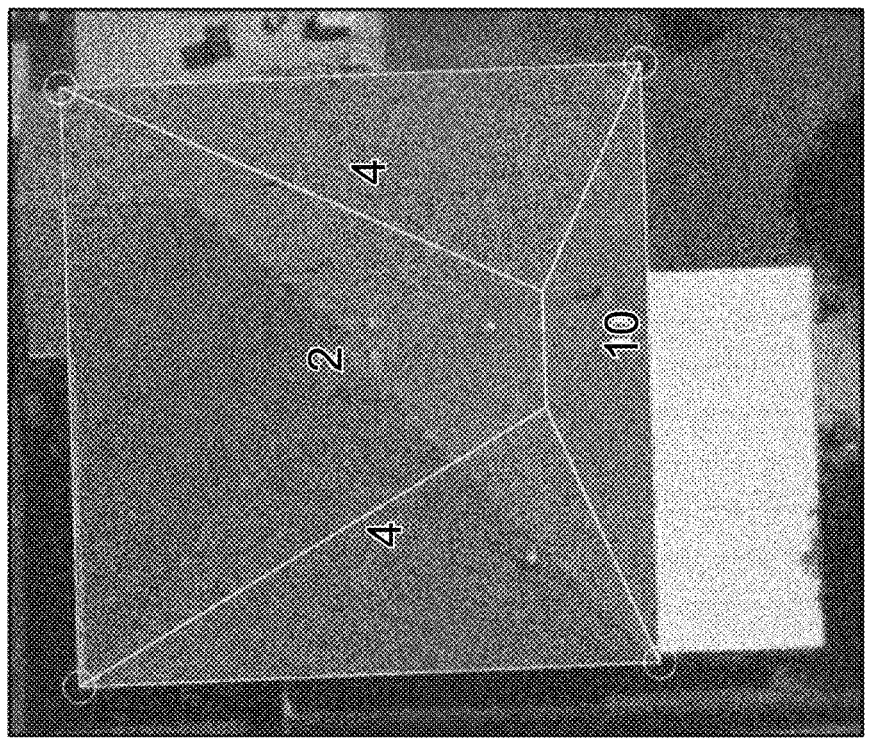

It should further be noted that the slopes can be changed to produce different 3D faces. FIGS. 12A-12B illustrate an output of the modified straight skeleton algorithm based on the input contour segments as illustrated in FIG. 11A, but with different slope values. As seen, changing a slope values generates different 3D face configurations. By defining the roof contour segment and the slope values in different ways, a wide variety of roof configurations can be modeled.

Figure 13:
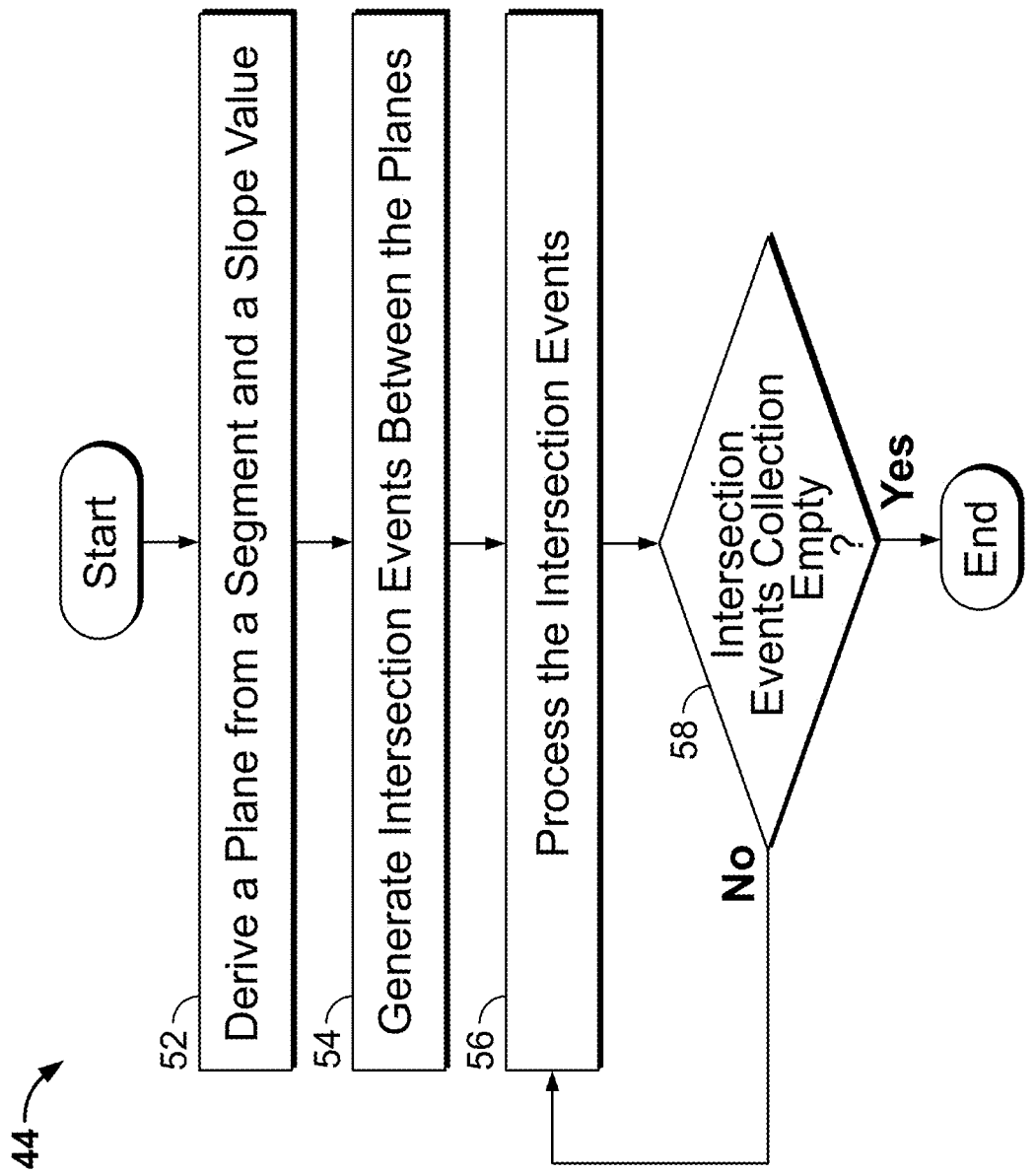
FIG. 13 is a flowchart illustrating step 44 of FIG. 10 in greater detail.

FIG. 13 is a flowchart illustrating step 44 of FIG. 10 in greater detail. In particular, FIG. 13 illustrates process steps for generating a collection of 3D roof faces. In step 52, the system derives a plane from one or more segments (e.g., roof contour segments) and a slope value. Specifically, the system rotates a direction vector of the segment counter-clockwise 90 degrees in x-y, then lifts the direction vector of the segment to form an angle with a horizontal plane by an amount indicated by the slope value.

Figure 14C:
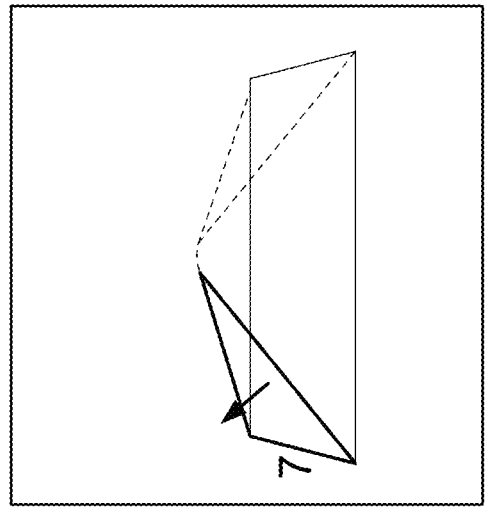
FIGS. 14A-14C are diagrams illustrating the system forming a plane from a segment and a slope.
Figure 14B:
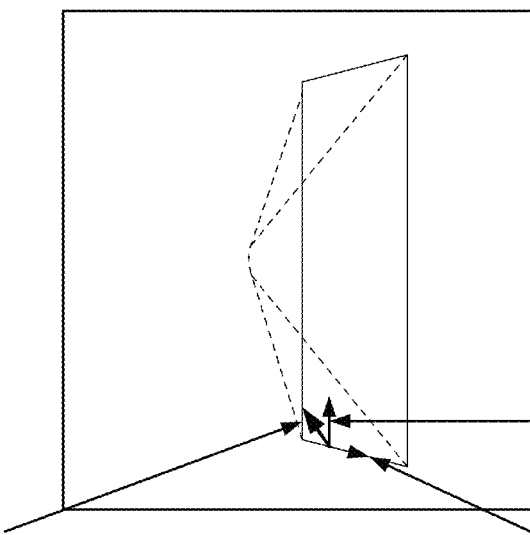
Figure 14A:
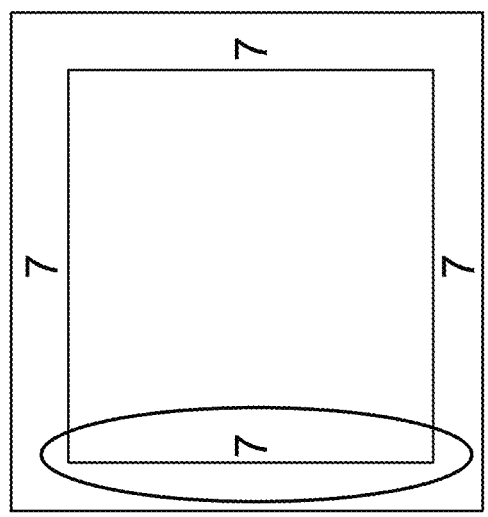

FIGS. 14A-14C are an illustration of the system forming a plane from a segment and a slope, as described in step 52. Specifically, FIG. 14A shows the segment and a slope value (7), which are circled. FIG. 14B shows the direction of the segment, a vector rotated 90 degrees in x-y, and the vector lifted to form an angle with a horizontal plane according to the slope value, then normalized. FIG. 14C shows a resultant face within the derived plane (same normal vector).

The system keeps track of which segments (from step 52) result in completed faces and which do not. A segment whose face is not complete is called an active segment and is part of an active polygon. The modified straight skeleton algorithm can use a main data structure to maintain a list of the active polygons (and/or active segments) while the system executes other processes of the modified straight skeleton algorithm.

Figure 15A:
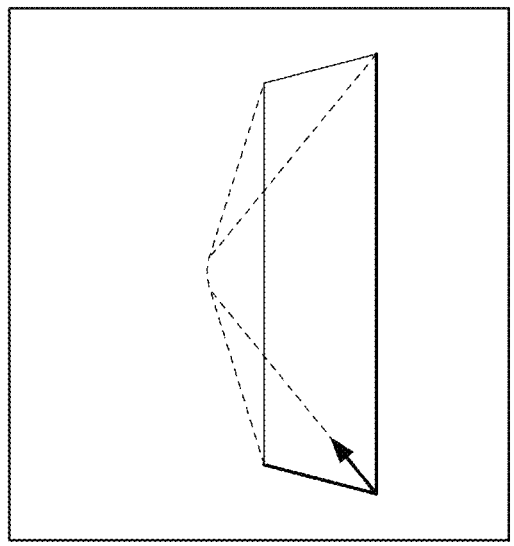
FIGS. 15A-15C is a diagram illustrating examples of angular bisectors.
Figure 15B:
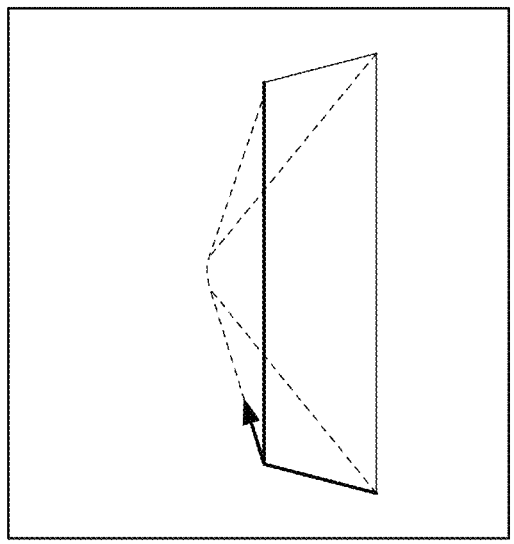
Figure 15C:
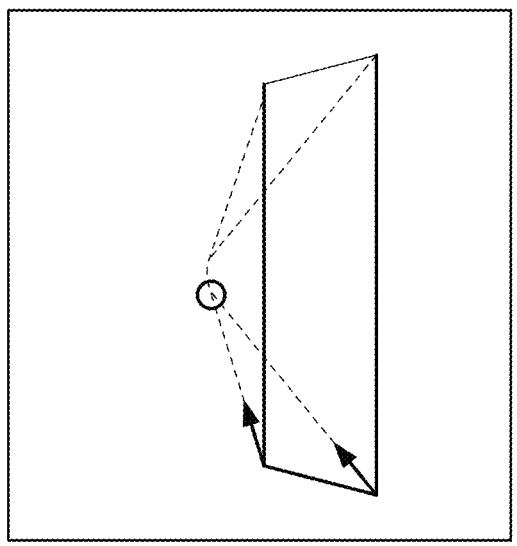

In step 54, the system generates intersection events between the planes. Specifically, the system intersects one or more pairs of planes to form angular bisectors. The system then intersects the angular bisectors to form the intersection events. FIG. 15A is an illustration showing a first example of an angular bisector formed from planes of two segments. FIG. 15B is an illustration showing a second example of an angular bisector formed from planes of two segments. FIG. 15C is an illustration showing an intersection of two angular bisectors forming an intersection point.

Any number of planes can intersect to form the intersection events. For every unique location formed by the intersections, an intersection event is generated and added to an intersection events collection.

Referring back to FIG. 13, in step 56, the system processes the intersection events from the intersection events collection. The intersection events can be processed in order from, for example, a lowest to a highest z value, a highest to a lowest z value, etc. By processing the intersection events, a number of active segments can be reduced as the active polygons shrink and/or split. Step 56 will be explained in greater detail below.

In step 58, the system determines whether the intersection events collection is empty (e.g., no more intersection events). When the intersection events collection is determined not to be empty, the system returns to step 56. When the intersection events collection is determined to be empty, the process of step 44 ends.

Figure 16:
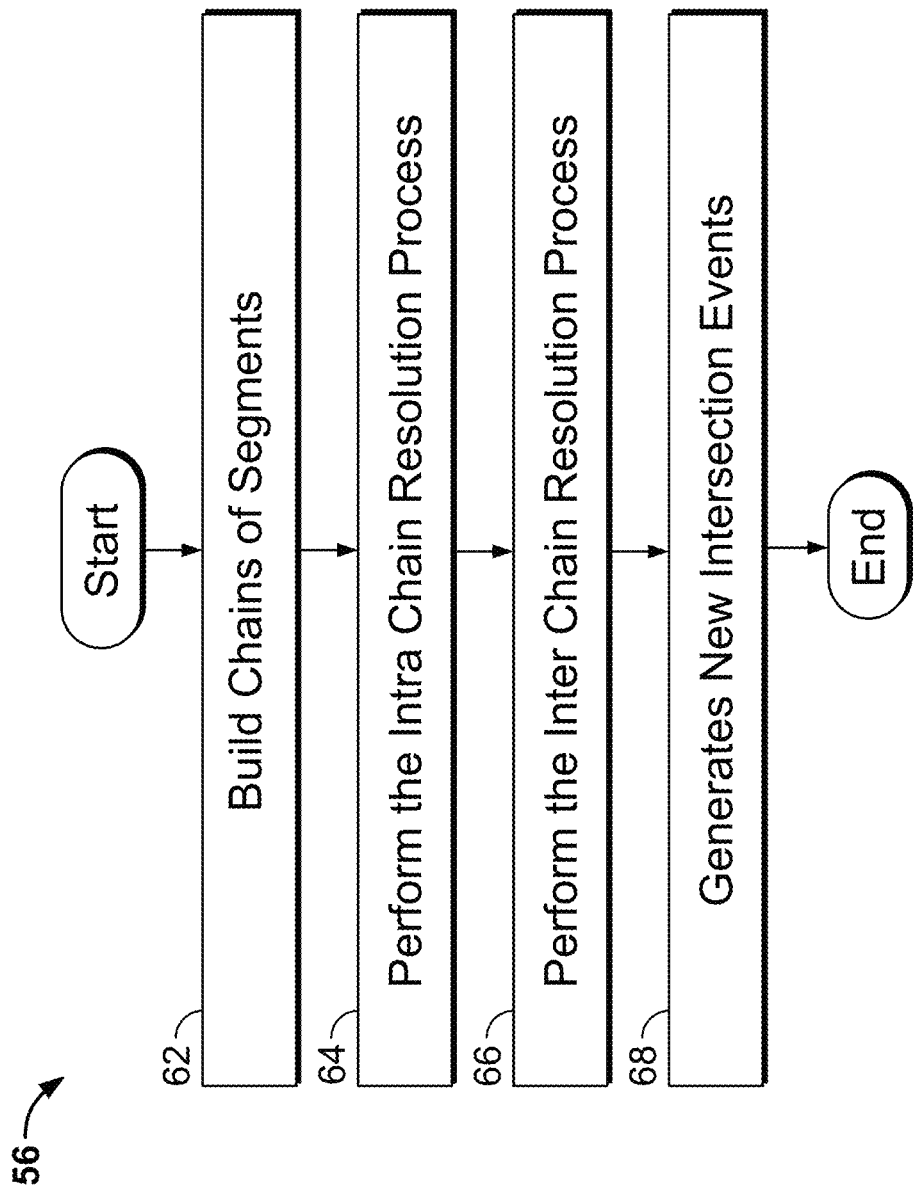
FIG. 16 is a flowchart illustrating step 56 of FIG. 13 in greater detail.

FIG. 16 is a flowchart illustrating step 56 of FIG. 13 in greater detail. In step 62, the system builds chains of segments. Specifically, the system groups the active segments whose planes form an intersection event into one or more chains of consecutive segments per the active polygon. In step 64, the system performs an intra chain resolution process. Specifically, each individual chain adds interior roof lines and, if applicable, extracts completed faces. This process removes associated input segments from the active polygon. In step 66, the system performs as inter chain resolution process. Specifically, the active polygon can be split when two or more chains exist. In step 68, the system generates new intersection events. Specifically, new neighboring planes can result in new intersection events that did not previously exist. The new intersection events are added to the intersection events collection to be processed.

Figure 17C:
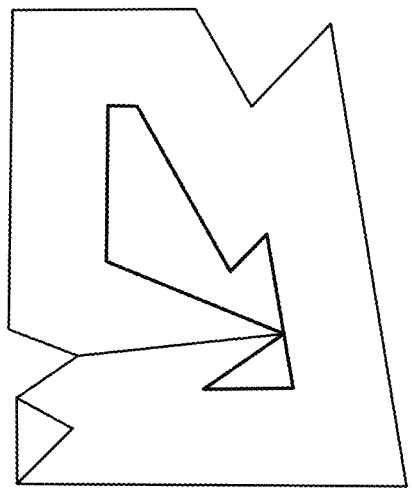
FIGS. 17A-17F is a diagram illustrating an active polygon shrinking and splitting process carried out by the system.
Figure 17B:
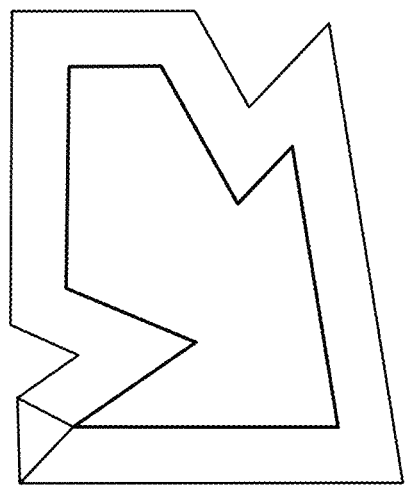
Figure 17A:
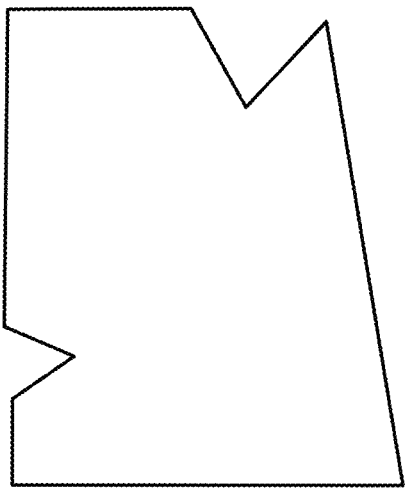
Figure 17F:
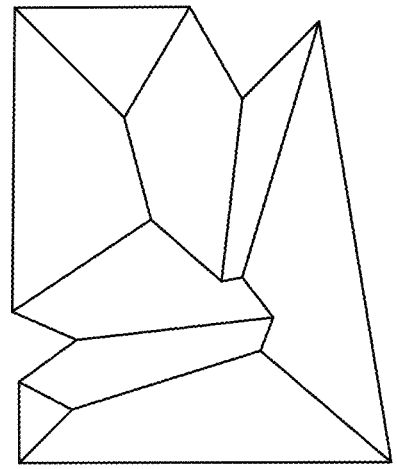
Figure 17E:
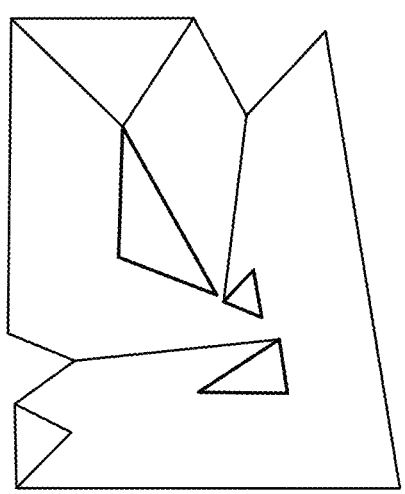
Figure 17D:
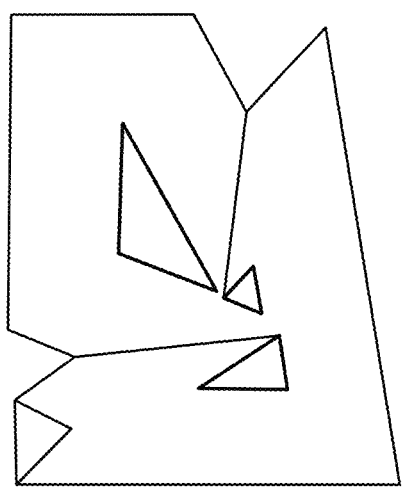

FIGS. 17A-17F are illustrations showing an active polygon shrinking and splitting process performed by the system. Interior lines are added until the active polygon has shrunk to nothing and all interior lines are present. In FIG. 17A, the active polygon starts with the same shape as an input contour. In FIG. 17B, a first intersection event adds two interior lines. In FIG. 17C, a second intersection event adds one interior line and the active polygon splits. In FIG. 17D, a third intersection event adds one interior line and the active polygon splits again. In FIG. 17E, a fourth intersection event adds two interior lines. In FIG. 17F, after 3 more intersection events, the active polygon shrinks to nothing and all interior lines are present.

Figure 18:
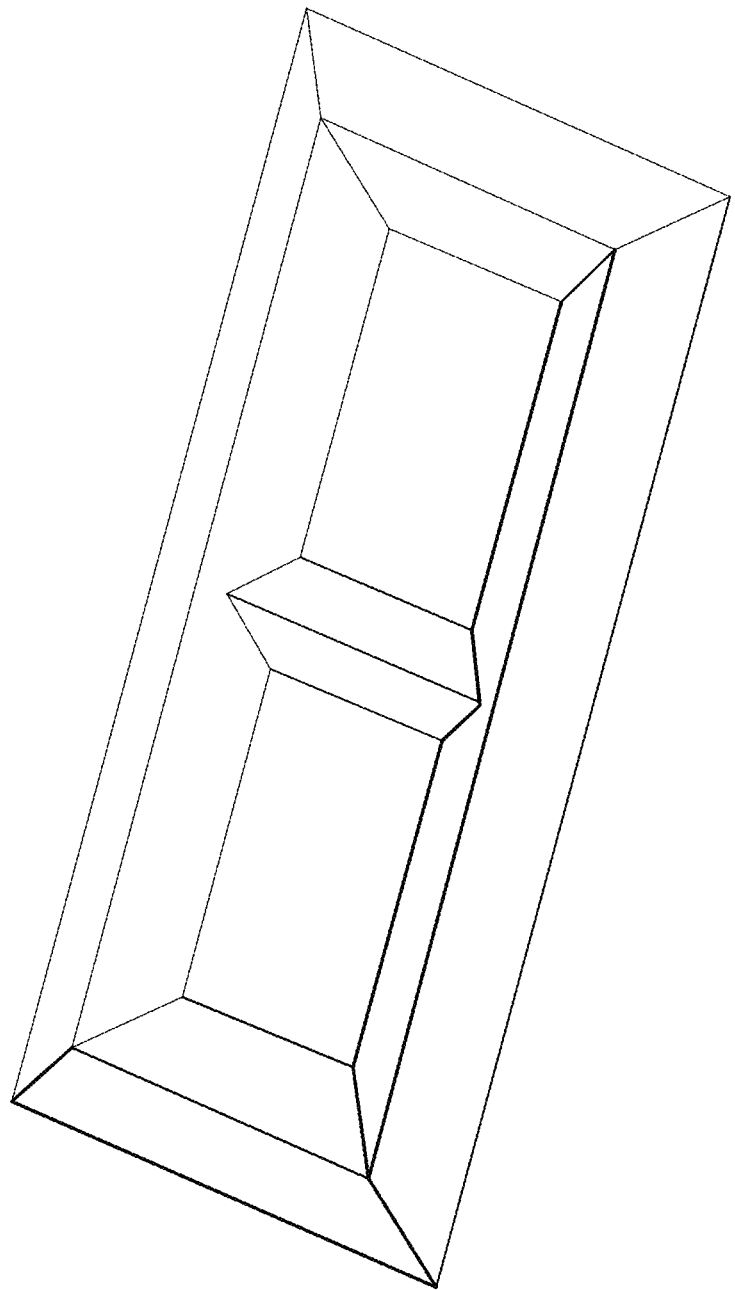
FIG. 18 is a diagram illustrating an example output with two holes.

It should be understood that the modified straight skeleton algorithm can also process holes in structures. In an example, the user can add additional roof contour segments that are wound clockwise instead of counter-clockwise to enable the modified straight skeleton algorithm process holes. FIG. 18 is an illustration showing an example output with two holes.

The processes discussed above regarding the modified straight skeleton algorithm allow for a large variety of roof configurations to be modeled and ensures a geometry is constrained to always maintain a valid structure. However, more modeling power may be needed to model multi-eave height structures, tie-ins, dormers, Dutch hips, and other roof configurations. The following will discuss methods to enable the modified straight skeleton algorithm to model these roof configurations.

Figure 19:
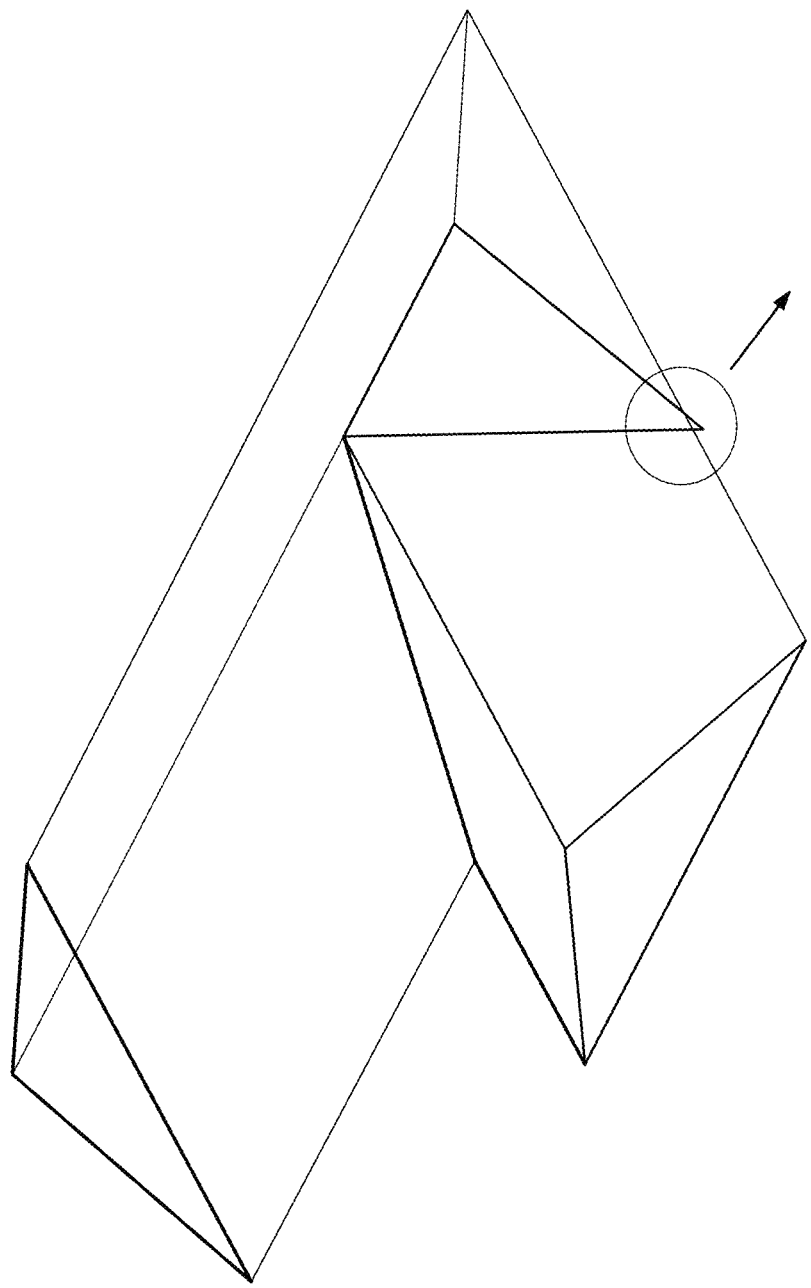
FIG. 19 is a diagram illustrating an example of a roof face that collapses to a single point on a input contour.

Certain roof configurations have roof faces that collapse to a single point on the input contour, as illustrated in FIG. 19. A special type of segment known as a zero-length segment allows for these types of roof faces. In order for the zero-length segments to adhere to an input interface, the zero-length segments require a direction and a slope. However, the direction may not be implicitly held in the segment since both endpoints are the same point. As such, a segment direction may need to be given as input by the user.

Figure 20:
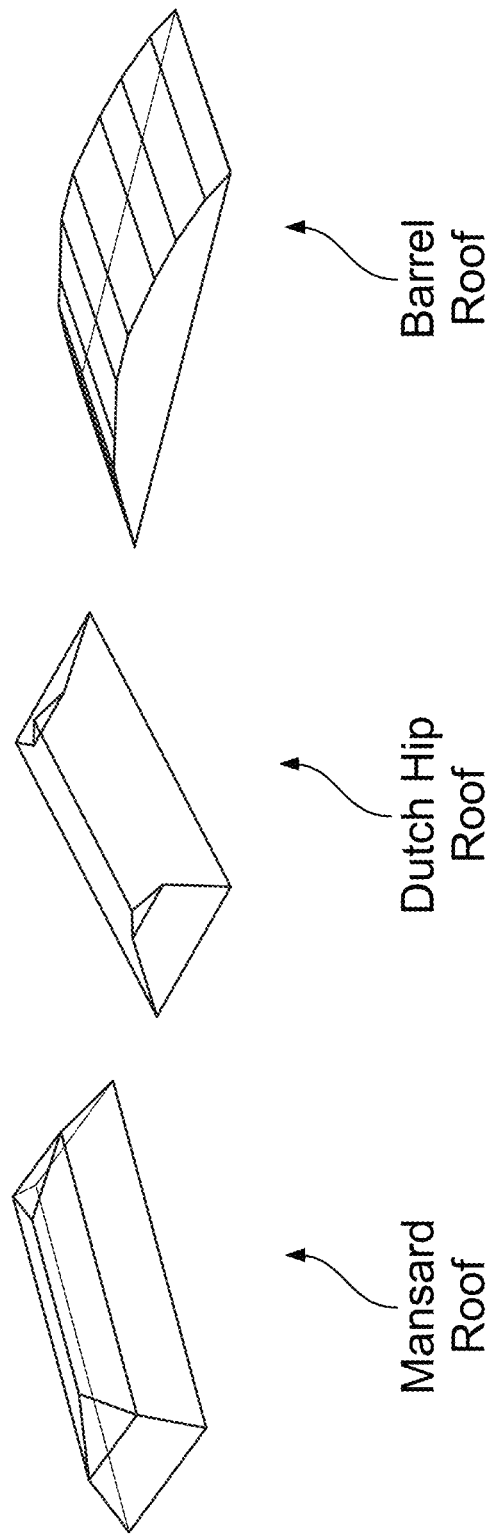
FIG. 20 is a diagram illustrating roofs that require plane changes.
Figure 21:
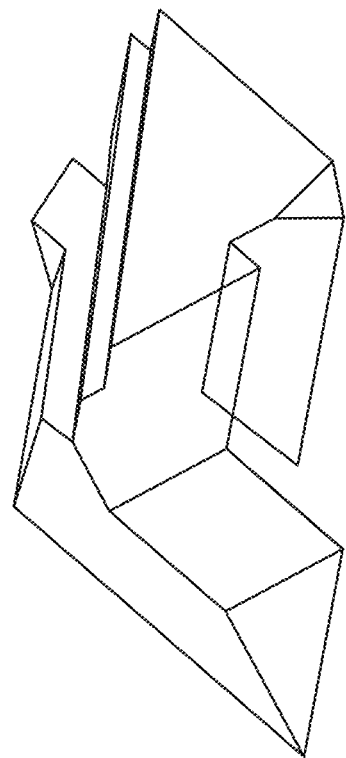
FIG. 21 is a diagram illustrating roofs that require dormers and tie-ins.
Figure 21:
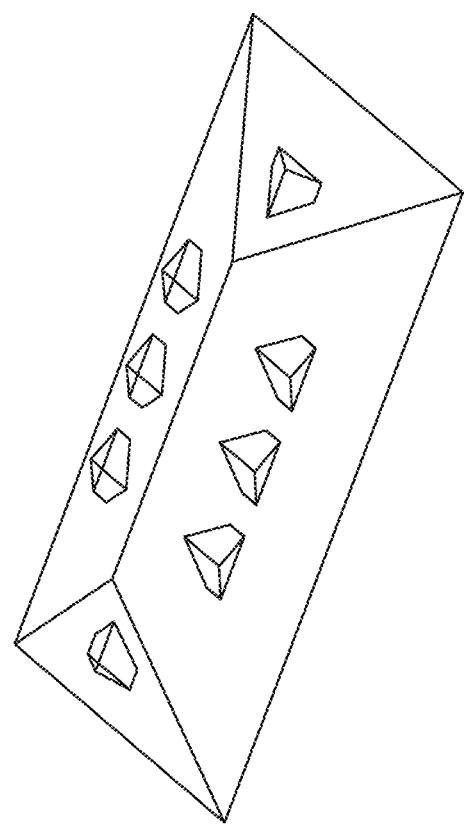

Further roof configurations, such as a Dutch hips, mansards, and barrel roofs require planes to change part way through execution. FIG. 20 is an illustration showing examples of roofs that require plane changes. Even further roof configurations require tie-ins, dormers, and multiple eave heights. FIG. 21 is an illustration showing examples of roofs that require dormers and tie-ins. A user event method can used to process the above discussed roof configurations. Specifically, user events are inserted as user-defined input alongside input contour segments. User events occur at specific 3D locations and are handled alongside intersection events from, for example, a lowest to a highest z.

Figure 22:
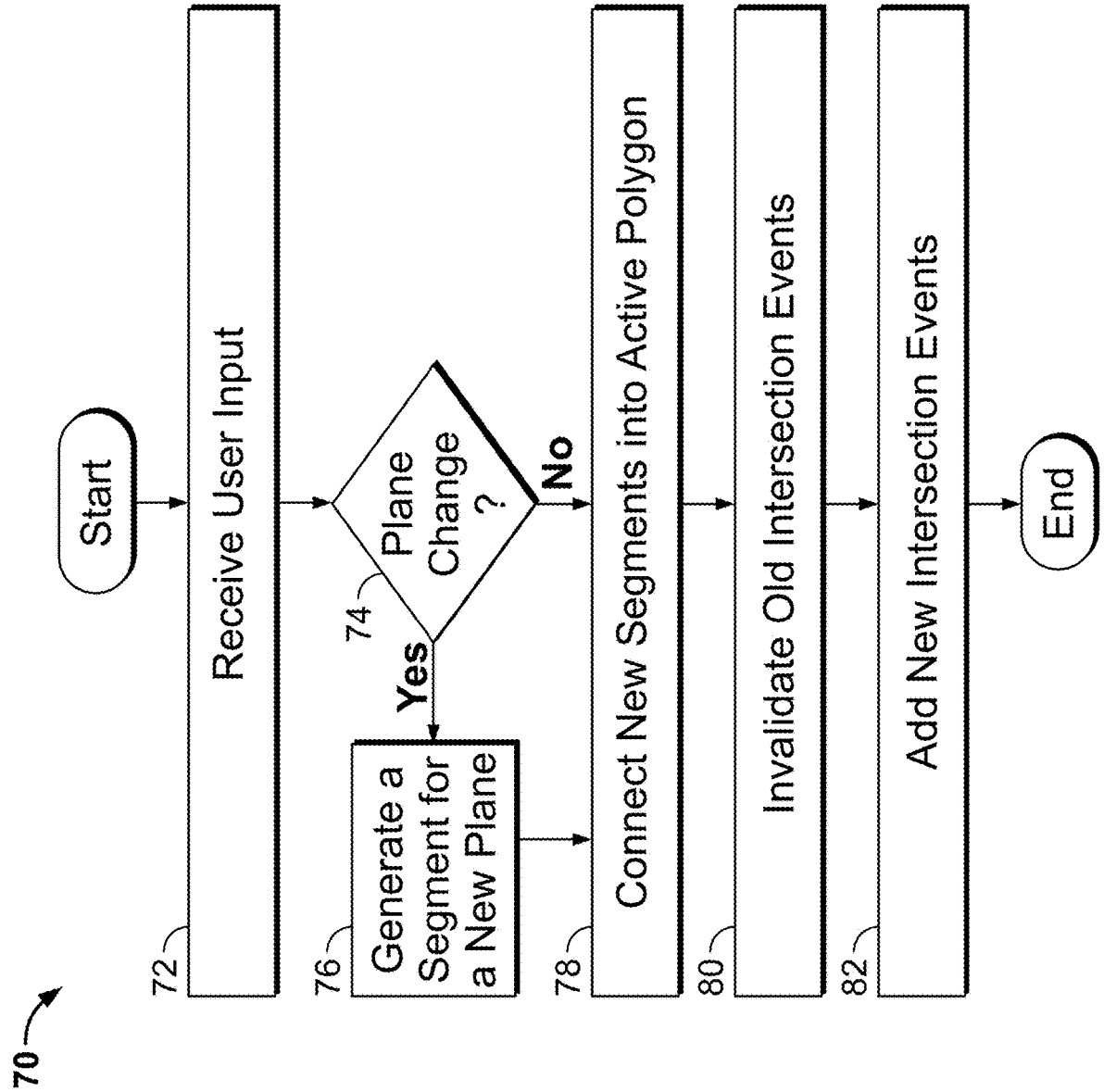
FIG. 22 is a flowchart illustrating the overall process steps of a user event method carried out by the system of the present disclosure.
Figure 23:
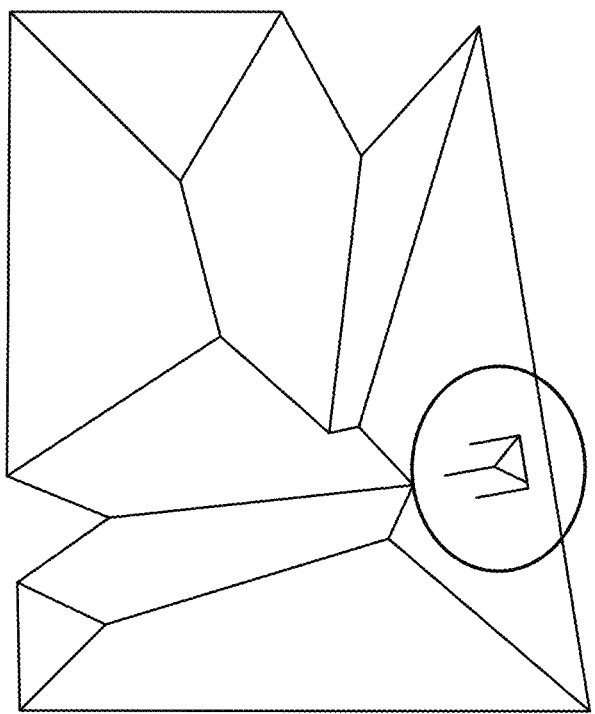
FIG. 23 is a diagram illustrating a dormer being spliced by the system into a structure.
Figure 23:
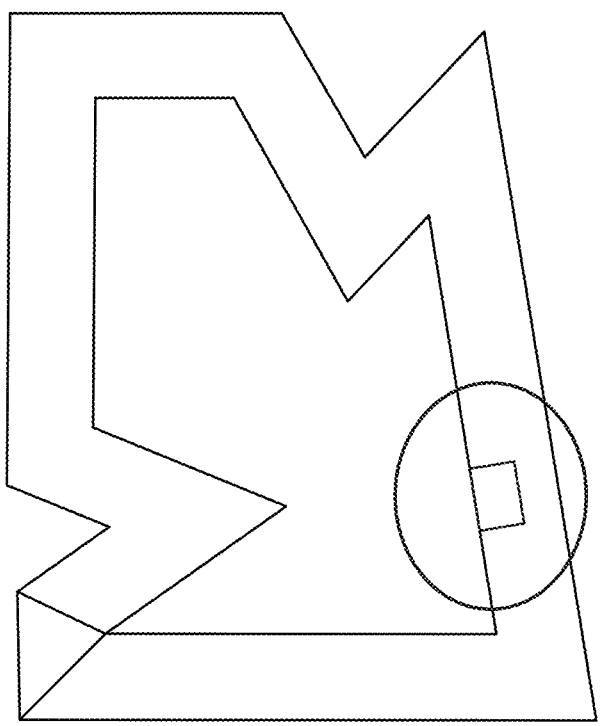

FIG. 22 is a flowchart illustrating the overall process steps of a user event handling process carried out by the system, indicated generally at 70. In step 72, the system receives a user input. The user input can include one or more roof contour segments, one or more slope, etc. In step 74, the system determines whether a plane change occurred (e.g., a new plane is generated, added, etc.) If the plane change occurred, the system proceeds to step 76. If no plane change occurred, the system proceeds to step 78. In step 76, the system generates a segment(s) for the new plane. Specifically, the system generates a new segment for the new plane to be spliced into an active polygon. In step 78, the system connects the new segment into an active polygon to allow arbitrary shapes to be spliced into the active polygon. In step 80, the system invalidates one or more old intersection events. In step 82, the system adds a new intersection event(s) to ensures that all valid and necessary intersection events are in the intersection events collection. FIG. 23 is an illustration of a dormer being spliced into a structure.

Figure 24:
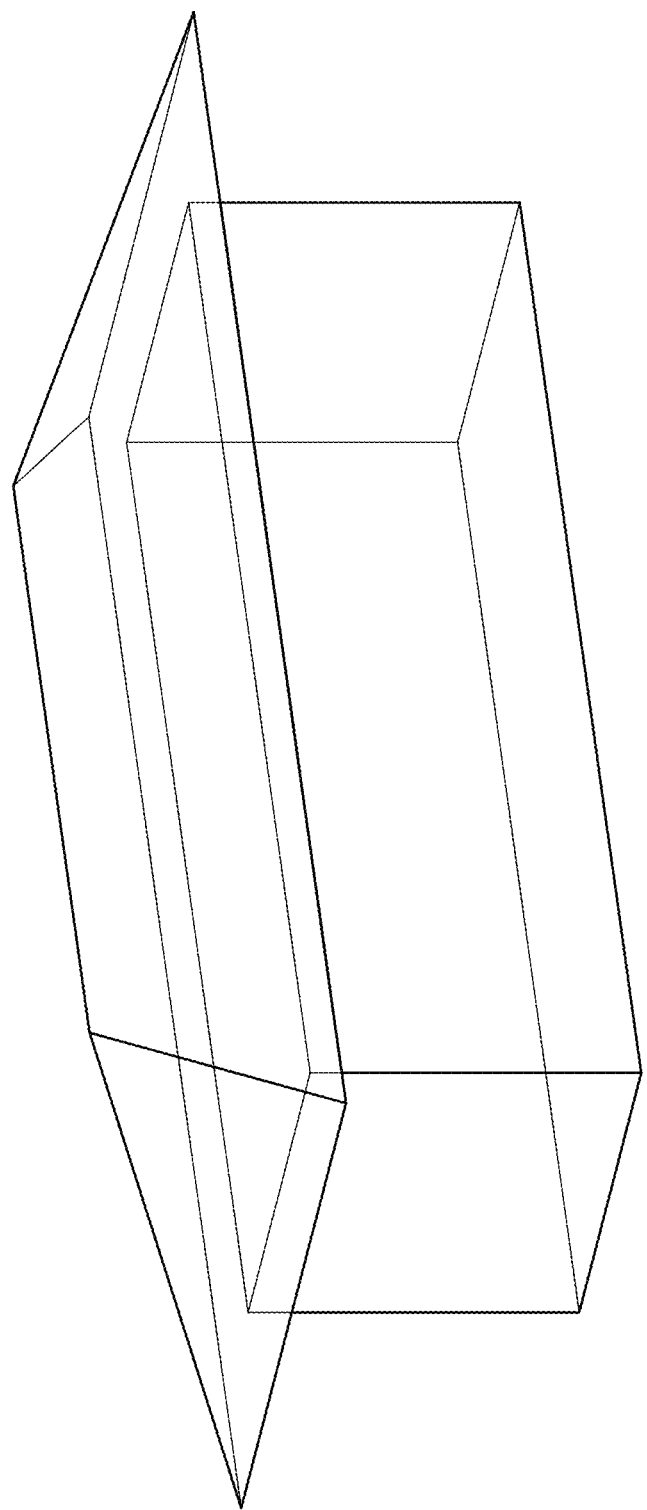
FIG. 24 is a diagram illustrating walls generated by the system via the modified straight skeleton algorithm.

The system can further use the modified straight skeleton algorithm to generate wall. In an embodiment, the system employs an exterior contour as a wall footprint with all pitches set to vertical, and then replaces the exterior contour with a user event at a height to generate the walls alongside the roof. FIG. 24 is an illustration showing the walls generated via the modified straight skeleton algorithm.

Thus, the modified straight skeleton algorithm allows for a parameterized roof structure that derives all interior lines from input segments and planes including holes. Innovations on the core algorithm including zero-length segments, user events, and walls allow for powerful modeling of a wide variety of roof configurations. The modified straight skeleton algorithm ensures the geometry is constrained to maintain a valid structure.

Figure 25:
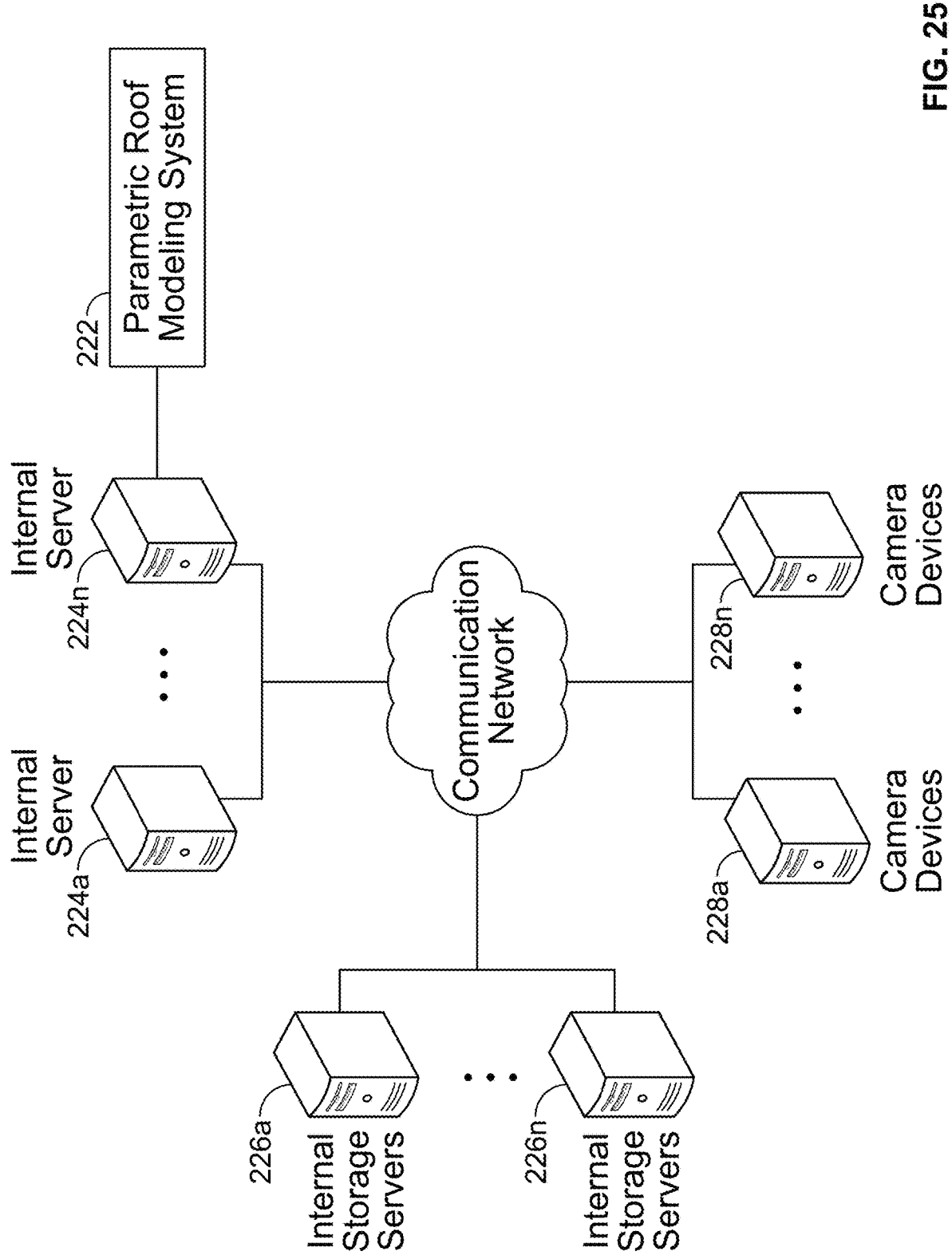
FIG. 25 is a diagram illustrating sample hardware components on which the system of the present disclosure could be implemented.

FIG. 25 is a diagram illustrating computer hardware and network components on which the system of the present disclosure could be implemented. The system can include a plurality of internal servers 224a-224n having at least one processor and memory for executing the computer instructions and methods described above (which could be embodied as computer software 222 illustrated in the diagram). The system can also include a plurality of image storage servers 226a-226n for receiving the image data and video data. The system can also include a plurality of camera devices 228a-228n for capturing image data and video data. These systems can communicate over a communication network 230. The parametric roof modeling system or engine can be stored on the internal servers 224a-224n or on an external server(s). Of course, the system of the present disclosure need not be implemented on multiple devices, and indeed, the system could be implemented on a single computer system (e.g., a personal computer, server, mobile computer, smart phone, etc.) without departing from the spirit or scope of the present disclosure.

Having thus described the system and method in detail, it is to be understood that the foregoing description is not intended to limit the spirit or scope thereof. It will be understood that the embodiments of the present disclosure described herein are merely exemplary and that a person skilled in the art can make any variations and modification without departing from the spirit and scope of the disclosure. All such variations and modifications, including those discussed above, are intended to be included within the scope of the disclosure. What is desired to be protected by Letters Patent is set forth in the appended claims.

What is claimed is:

1. A system for generating a parametric model of a roof structure comprising:
a memory; and
a processor in communication with the memory, the processor:
receiving a plurality of parameters, stored in the memory, of each roof component composing the roof structure,
executing a geometry creation algorithm based on the received plurality of parameters,
generating a constrained three-dimensional geometry based on an output of the geometry creation algorithm, the constrained three-dimensional geometry comprising a polyhedron of each roof component composing the roof structure,
generating a three-dimensional model of the roof structure, based on the constrained three-dimensional geometry, by executing a constructive solid geometry algorithm to combine overlapping polyhedrons of each roof component,
displaying the three-dimensional model of the roof structure, wherein the processor;
translates a received parameter, among the plurality of parameters, of each roof component such that a determined point of the received parameter lies on an origin of a coordinate system;
generates a polygon model of the translated parameters, the polygon model having a number of polygons indicative of a number of roof planes associated with each roof component;
projects the number of polygons onto a plane indicative of the roof structure;
determines a plurality of intersection lines among the number of polygons;
generates, based on the determined intersection lines, a polyhedron indicative of the roof structure and building associated with the roof structure;
generates the polyhedron of each roof component composing the roof structure; and
generates the three-dimensional model of the roof structure by executing the constructive solid geometry algorithm to combine overlapping polyhedrons of each roof component.

2. The system of claim 1, wherein each roof component is indicative of at least one of a gable, a hip, a turret, a shed, a hip-gable, a Dutch hip, a barrel, a pyramid, a partial-hip, a mansard, a flat-mansard, a gambrel, a chimney, a tie-in, a bay window and a nested-turret.

3. The system of claim 1, wherein the plurality of parameters are indicative of a roof component type, roof width, a roof length, a ridge height, a slope, an eave height, a slope, an azimuth, a roof reference point, a pitch, a roof contour and an orientation of a segment of the roof contour.

4. The system of claim 1, wherein the plurality of parameters are indicative of a roof component type, a roof contour, an eave height, a slope and an orientation of a segment of the roof contour.

5. A method for generating a parametric model of a roof structure comprising:
receiving a plurality of parameters, stored in a memory, of each roof component composing the roof structure;
executing a geometry creation algorithm based on the received plurality of parameters,
generating a constrained three-dimensional geometry based on an output of the geometry creation algorithm, the constrained three-dimensional geometry comprising a polyhedron of each roof component composing the roof structure;
generating a three-dimensional model of the roof structure, based on the constrained three-dimensional geometry, by executing a constructive solid geometry algorithm to combine overlapping polyhedrons of each roof component;
displaying the three-dimensional model of the roof structure;
translating a received parameter, among the plurality of parameters, of each roof component such that a determined point of the received parameter lies on an origin of a coordinate system;
generating a polygon model of the translated parameters, the polygon model having a number of polygons indicative of a number of roof planes associated with each roof component;
projecting the number of polygons onto a plane indicative of the roof structure;
determining a plurality of intersection lines among the number of polygons;
generating, based on the determined intersection lines, a polyhedron indicative of the roof structure and building associated with the roof structure;
generating the polyhedron of each roof component composing the roof structure; and
generating the three-dimensional model of the roof structure by executing the constructive solid geometry algorithm to combine overlapping polyhedrons of each roof component.

6. The method of claim 5, wherein each roof component is indicative of at least one of a gable, a hip, a turret, a shed, a hip-gable, a Dutch hip, a barrel, a pyramid, a partial-hip, a mansard, a flat-mansard, a gambrel, a chimney, a tie-in, a bay window and a nested-turret.

7. The method of claim 5, wherein the plurality of parameters are indicative of a roof component type, roof width, a roof length, a ridge height, a slope, an eave height, a slope, an azimuth, a roof reference point, a pitch, a roof contour and an orientation of a segment of the roof contour.

8. The method of claim 5, wherein the plurality of parameters are indicative of a roof component type, a roof contour, an eave height, a slope and an orientation of a segment of the roof contour.

9. A non-transitory computer readable medium having instructions stored thereon for generating a parametric model of a roof structure which, when executed by a processor, causes the processor to carry out the steps of:
receiving a plurality of parameters, stored in a memory, of each roof component composing the roof structure;
executing a geometry creation algorithm based on the received plurality of parameters,
generating a constrained three-dimensional geometry based on an output of the geometry creation algorithm, the constrained three-dimensional geometry comprising a polyhedron of each roof component composing the roof structure;
generating a three-dimensional model of the roof structure, based on the constrained three-dimensional geometry, by executing a constructive solid geometry algorithm to combine overlapping polyhedrons of each roof component;
displaying the three-dimensional model of the roof structure;
translating a received parameter, among the plurality of parameters, of each roof component such that a determined point of the received parameter lies on an origin of a coordinate system;
generating a polygon model of the translated parameters, the polygon model having a number of polygons indicative of a number of roof planes associated with each roof component;
projecting the number of polygons onto a plane indicative of the roof structure;
determining a plurality of intersection lines among the number of polygons;
generating, based on the determined intersection lines, a polyhedron indicative of the roof structure and building associated with the roof structure;
generating the polyhedron of each roof component composing the roof structure; and
generating the three-dimensional model of the roof structure by executing the constructive solid geometry algorithm to combine overlapping polyhedrons of each roof component.

10. The computer readable medium of claim 9, wherein each roof component is indicative of at least one of a gable, a hip, a turret, a shed, a hip-gable, a Dutch hip, a barrel, a pyramid, a partial-hip, a mansard, a flat-mansard, a gambrel, a chimney, a tie-in, a bay window and a nested-turret.

11. The computer readable medium of claim 9, wherein the plurality of parameters are indicative of a roof component type, roof width, a roof length, a ridge height, a slope, an eave height, a slope, an azimuth, a roof reference point, a pitch, a roof contour and an orientation of a segment of the roof contour.

12. The computer readable medium of claim 9, wherein the plurality of parameters are indicative of a roof component type, a roof contour, an eave height, a slope and an orientation of a segment of the roof contour.

* * * * *